(12) United States Patent
Fine et al.

(10) Patent No.: US 8,396,777 B1
(45) Date of Patent: Mar. 12, 2013

(54) PREDICTION MARKET DATABASE, RELATED METHODS, DEVICES AND SYSTEMS

(75) Inventors: Leslie R. Fine, Menlo Park, CA (US); Matthew J. Fogarty, Palo Alto, CA (US); Matthew Shore, San Mateo, CA (US)

(73) Assignee: Spigit, Inc., Pleasanton, CA (US)

( * ) Notice: Subject to any disclaimer, the term of this patent is extended or adjusted under 35 U.S.C. 154(b) by 615 days.

(21) Appl. No.: 12/478,738

(22) Filed: Jun. 4, 2009

Related U.S. Application Data

(63) Continuation-in-part of application No. 12/172,140, filed on Jul. 11, 2008.

(60) Provisional application No. 60/950,700, filed on Jul. 19, 2007, provisional application No. 60/955,826, filed on Aug. 14, 2007, provisional application No. 61/108,615, filed on Oct. 27, 2008.

(51) Int. Cl.
*G06Q 40/00* (2012.01)
(52) U.S. Cl. ............. 705/36 R; 705/35; 705/39; 705/44
(58) Field of Classification Search ............... 705/36
See application file for complete search history.

(56) References Cited

U.S. PATENT DOCUMENTS

| | | | |
|---|---|---|---|
| 7,155,510 B1* | 12/2006 | Kaplan | 709/224 |
| 2002/0073009 A1 | 6/2002 | Hogg et al. | |
| 2003/0074166 A1 | 4/2003 | Jackson et al. | |
| 2003/0078829 A1* | 4/2003 | Chen et al. | 705/10 |
| 2004/0002891 A1 | 1/2004 | Chen et al. | |
| 2005/0256800 A1 | 11/2005 | Hogg et al. | |
| 2006/0122927 A1 | 6/2006 | Huberman et al. | |
| 2006/0205483 A1* | 9/2006 | Meyer et al. | 463/25 |
| 2007/0078756 A1 | 4/2007 | Hogg et al. | |
| 2007/0136105 A1 | 6/2007 | Huberman et al. | |
| 2007/0136429 A1* | 6/2007 | Fine et al. | 709/206 |
| 2009/0076939 A1 | 3/2009 | Berg et al. | |

OTHER PUBLICATIONS

"Economic Derivatives Markets-New Opportunities for Individual Investors: A Research Agenda", Financial Services Review, Robert Dubil, vl 6n2, pp. 89-104, Summer 2007.*

* cited by examiner

*Primary Examiner* — Hai Tran

(57) ABSTRACT

This disclosure provides a database, methods and associated software to implement and manage a prediction market. By collecting individual predictions as a set of predicted outcomes, such as a range of outcomes, the principles presented herein permit aggregation of overlapping predictions to generate a cumulative probability distribution, effectively using "crowd wisdom" to build a probability model of an event. Through the use of "roll-up" and "roll-down" techniques, this disclosure provides a way of applying new information not only to an event being predicted, but also to the outcomes of other, related events. Conversion to a common probability distribution format may be used to simplify and accelerate mathematical operations, easing the burden in quickly calculating and updating a cumulative probability model for events in each affected dimension in the predicted market. These teachings may be applied to a wide variety of applications, including gaming, blog and opinion sites, spreadsheet programs, and date, logistics, accounting and other forecasting tools.

36 Claims, 7 Drawing Sheets

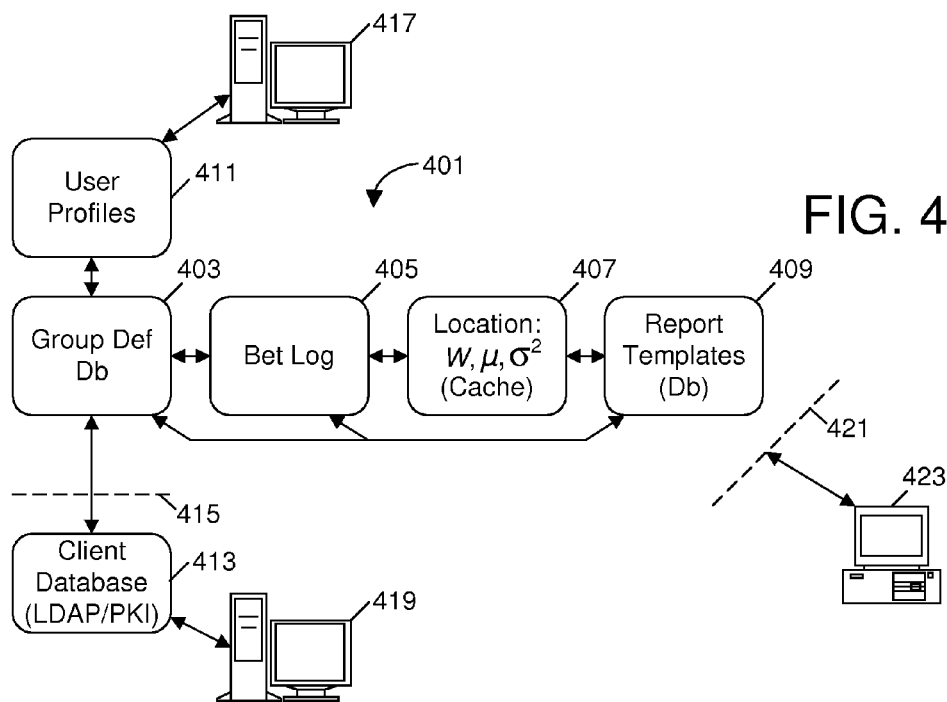
FIG. 4
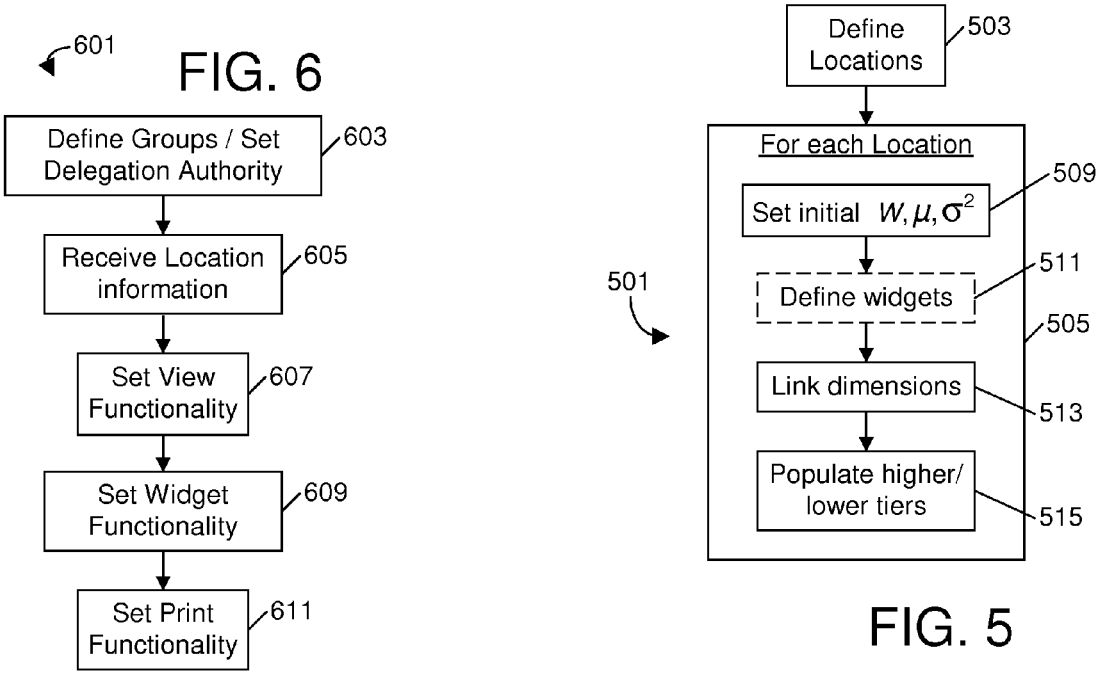
FIG. 6
FIG. 5

```
Bet Log                                                    901
#    Tmstmp          UID    Loc.    x    y   Result  Bet      Return
(1)  0411080812.11   21     123J7   38   41  43      $100     $0
(2)  0411080819.06   7      123K1   20   30  22      $100     $115
(3)  0411080951.77   11     123J7   40   50  43      $175     $212.50
(4)  0421115622.67   7      123K1   40   50  43      ($100)   $115
        o                           o
        o                           o
        o                           o
(i)  0728081641.63   44     074D8   120  125         $100     $120
```

User Profile (Record) — 701
- Capital (Balance)
- Name
- Group
- LDAP/PKI Link
- # Trades
- Winnings
- Game / Location Link

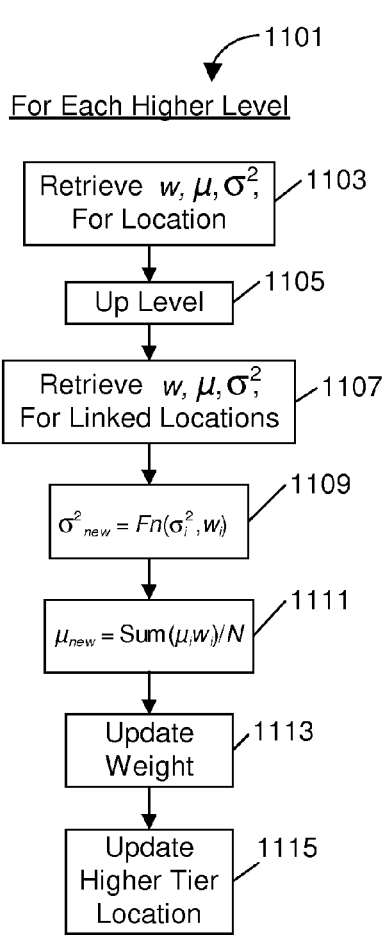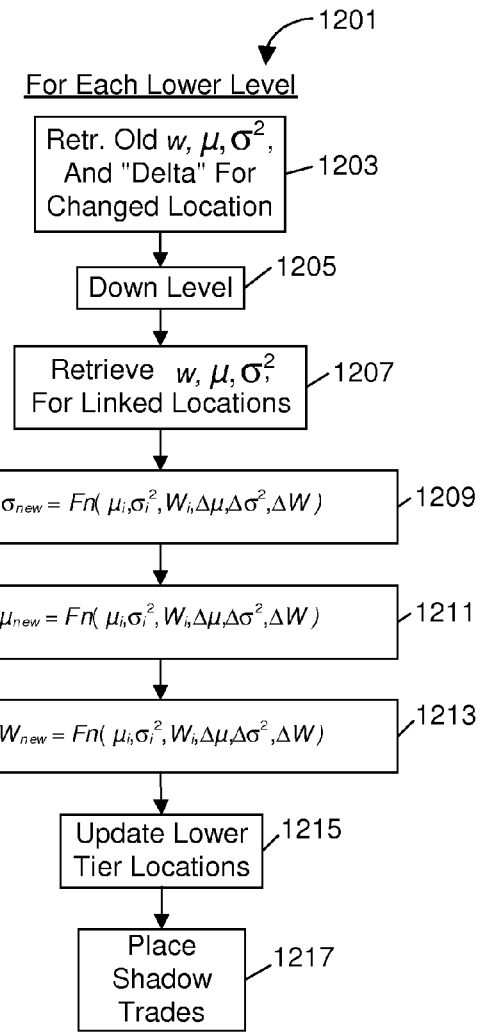
FIG. 11
FIG. 12

PREDICTION MARKET DATABASE, RELATED METHODS, DEVICES AND SYSTEMS

This document is a continuation in-part of U.S. patent application Ser. No. 12/172,140 for Prediction Market Roll Up, filed by inventor Matthew John Fogarty on Jul. 11, 2008, which itself claims priority to U.S. Provisional Patent Application Nos. 60/950,700, filed Jul. 19, 2007, and 60/995,826, filed Aug. 14, 2007, each one of which is hereby incorporated by reference. This document is also a non-provisional application of U.S. Provisional Patent Application No. 61/108,615 for Forecasting System and Methods Based on Knowledge Aggregation, filed by inventors Leslie R. Fine and Matthew J. Fogarty on Oct. 27, 2008, which is also hereby incorporated by reference.

The present disclosure relates to computational analysis; more particularly, the present disclosure provides a prediction market, a relational database used for predicting future events based on crowd forecasts, and related methods, devices and systems.

BACKGROUND

The wisdom of crowds can often provide better decision-making capabilities than the best guesses of experts. Automated systems have therefore evolved to offer predictive tools to institutional clients based upon the analysis of a well-chosen set of individuals; these prediction services in turn are sometimes implemented as "prediction markets," i.e., as a system or game that attempts to measure the conviction of knowledgeable individuals with something at stake. A prediction market typically treats events being predicted as a financial market and allows users to trade "stocks" representing event outcomes. Because users can place varying bets on outcomes, the magnitude and type of bet made provides some measure of confidence of the user's belief. These "financial games" can involve "real money" but typically simply feature points or "play money" given to a number of users, with some means of rewarding those individuals that predict correct event outcomes. Prediction markets can be complex, sometimes being managed under the control of sophisticated software. Prediction markets and associated forecasting can be applied in a wide-variety of applications, from predicting the outcome of real-life events such as elections or sporting events, to corporate forecasting, and even to Las Vegas-style gaming. Other applications of this technology also exist.

Not surprisingly, the accuracy of forecasts are heavily-dependent on the nature of the underlying data. If the ability to support different possible event outcomes and express varying levels of confidence is sufficiently robust, the resultant forecasts can be quite accurate and provide flexibility to adjustment of underlying conditions. By contrast, if confidence cannot be easily expressed, and if the choice of outcome possibility is not sufficiently flexible, the forecast can both be inaccurate and provide little flexibility to changes in assumptions.

What is needed is a system and related method that can be used to provide additional capabilities in terms of collecting robust data and applying that data in a meaningful manner to a forecasting or similar system. The present invention addresses these needs and provides related advantages.

BRIEF DESCRIPTION OF THE DRAWINGS

The system 101 includes a relational database 103 having a number of fields 105 that define the particularities of the prediction market. An administrator tool 111 can be used to setup the prediction market and the relationships between its fields, while an interface 113 to the relational database provides most of the software functions for manipulating the fields to reflect user predictions. FIG. 1 shows a number of other elements that can be used to manage the prediction market, including a calculation engine 115, a prediction tool 117 (used by individual users to make their predictions for one or more events supported by the relational database), and a viewing and reporting tool 119.

FIG. 2A illustrates that each of these things can be further broken down into other dependencies (e.g., sales and cost for a particular month or quarter, present or past) and, if desired (and as indicated by phantom lines) organized by any desired alternative grouping, for example, country (US or Mexico), region (North America), Month, Quarter, Year, and so forth.

FIG. 4 provides another illustration of a system level implementation 401, with software components or modules generally designated as boxes 403, 405, 407, 409, 411 and 413. In the implementation of FIG. 4, individual software components may be hosted in different locations—for example a first phantom line 415 demarks the difference between a location used to centrally host prediction-market-specific components (above the line) from enterprise-specific-components (e.g., such as a corporate employee directory or security database); the components collectively represent a relational database. A second phantom line 423 demarks the difference in location between the hosting location (above and to the left of the line) from individual users' computers (below and to the right of the line), as these may be at individuals users' homes, work sites or in other locations).

FIG. 5 provides a flowchart 501 of a method of initializing a prediction market, that is, of seeding the market to define events and the interrelationship between multiple events in a multi-dimensional context. As alluded to earlier, this method may be performed by an administrator for the market and associated databases and systems. Defining a multi-dimensional framework for many embodiments may be relatively straightforward, e.g., establishing spreadsheets and mathematical operations between spreadsheets, creating desired display nuances, and implementing interactive functionality presented to users in order to make predictions (these interactive capabilities will be discussed below in the context of "widgets").

FIG. 6 provides a flowchart 601 that shows optional security-related or group related functions that might be employed by an administrator in initializing a prediction market. For example, it may be desired in some contexts for predictions to be made available only to senior management and, in some contexts, only certain individuals may be permitted to make predictions on a specific event; in addition, different users may be given different print or view functionality. As indicated by this FIG., an administrator may be given the "locations" defined as part of the process of FIG. 5 and responsively base access to a location, or "widget" functionality on the basis of group membership, as each collectively indicated by numerals 603, 605, 607, 609 and 611 in FIG. 6.

FIG. 7 indicates a number of fields that may be selected for some implementations of such an enrollment-based system. In other implementations, user profiles may also be used for some security functions (much of this functionality may be handled through server policies or lists, with assistance for example from an enterprise LDAP directory, or PKI membership and revocations list, or similar systems or protocols).

In FIG. 10, a dotted-line perimeter 1023 indicates those levels and associated locations that are adjusted based upon the intermediate-level change of assumptions.

FIG. 11 provides a flow chart 1101 associated with prediction market roll-up.

FIG. 12 provides a flow chart 1201 associated with prediction market roll-down.

DETAILED DESCRIPTION

Figure 1:
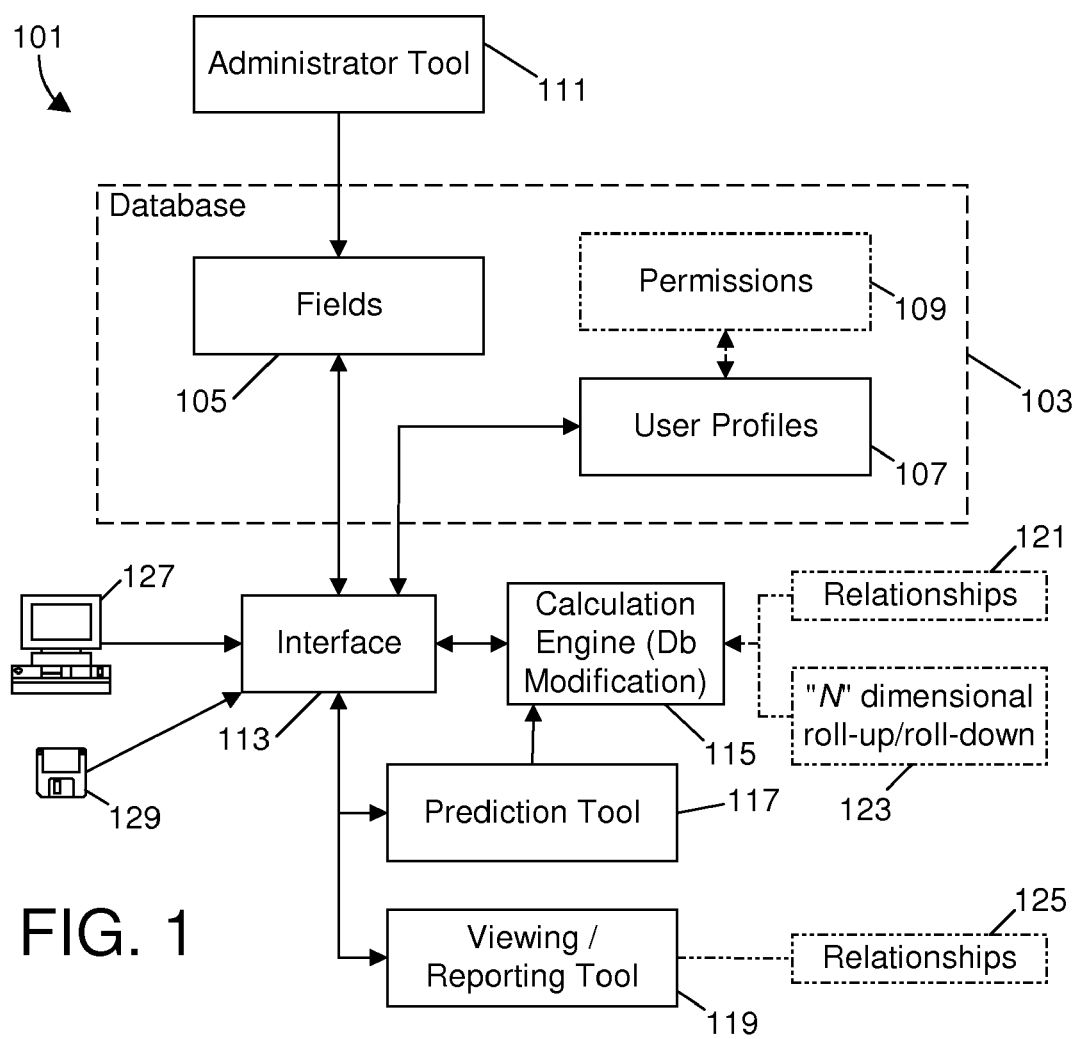
FIG. 1 is an illustrative view of one embodiment of a system 101 that can be used to manage a prediction market.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application to certain methods and devices. The description set out below exemplifies (i) a prediction market database, implemented as a relational database that defines a prediction market through a series of closely-related databases (for example, that store records of user predictions for one or more events, and that then models predictions for those events as a probability function based on the user predictions), (ii) a series of related methods, including methods that aggregate user inputs together to generate a cumulative probability function that can be used to model event likelihood, and (iii) related systems, methods and devices, including a prediction system as well as software stored on machine readable media that can be used to perform the aforementioned methods. The invention, however, may also be applied to other systems, methods and devices as well.

I. INTRODUCTION AND SYSTEM OVERVIEW

This disclosure provides a relational database, devices, systems and methods that related to the establishment of prediction markets, that is, that model occurrence of one or more prospective events based on an aggregation of user predictions for the events. The relational database, systems and methods provided by this disclosure are, generally speaking, automated systems that collect user predictions, compile those predictions together to automatically form a probability distribution for the event, and that then forecast the event such as by displaying the assembled probability model. By "probability distribution," it is meant that data is compiled to represent different forecasted outcomes with some mechanism for weighting some possible outcomes as more likely than others—that is, for embodiments discussed below, as multiple users provide their inputs, overlap in their predictions is translated as indicating a greater probability of outcome in the area of overlap than outside. The specific database, systems and methods provided by this disclosure address the problems mentioned earlier, including obtaining predictions that support different possible event outcomes and allowing users to express varying levels of confidence around a user-selected prediction point. For example, by allowing users to make a prediction that by its nature reflects the user's forecast, the methods and systems provided by this disclosure enhance information aggregation and provide a natural way to communicate user forecasts. Thus, for example, a user seeking to make a prediction on a specific event can express a complex set of beliefs, including (in some embodiments) a range of possible outcomes. Through the use of at least one range, or more complex mechanisms of inputting a user range, cumulative probability distributions may be built to model event forecasts in a manner generally not possible where all data represents a fixed betting point (e.g., a poll of users as to whether yearly sales will be "greater than $1 million dollars"). By permitting a user to specify the user's beliefs and quoting a return (or price) around the user's selection, the teachings provided below provide a mechanism for a user to weigh the user's confidence and amount of risk relative to the beliefs of others.

Expressing user belief in a system context can present a challenging obstacle. One embodiment presented by this disclosure therefore converts each user input into a common type of probability distribution, such as a Normal distribution with at least a mean and a sigma-value (e.g., set of points about the mean, a standard deviation, variance, or similar way of expressing "width" of the Normal distribution). Using a set of mathematical operations, multiple user inputs can then be aggregated and used to form a cumulative probability distribution. One embodiment in this disclosure relies upon a Normal distribution (a distribution well-understood and often used in the field of statistics), but it is also possible to adapt these teachings to other distributions (e.g., Poisson or other types of distributions). To deal with more complex prediction markets, including multi-tier or multi-dimensional markets, some implementations discussed below provide examples of how to "roll-up" or "roll down" predictions, that is, to cascade new information to dependent or contributing events, so that as one probability distribution is changed, (1) forecasts for other predicted events which are dependent upon the changing probability distribution can automatically be updated and/or (2) forecasts for other predicted events upon which the changed probability distribution is based can also be skewed to maintain consistency with changed expectations for the higher level event. Some, none, or all of these processes may be used for prediction markets based on this disclosure, depending on design of the particular prediction market. The use of a common distribution format presents the advantage, as will be discussed below, of facilitating the roll-up and roll-down functionality.

Finally, while there are many applications of prediction markets (including gambling, corporate forecasting, opinion polls, marketing purposes, or just games for diverse fun, e.g., on sports fan blog sites), it should be understood that there are a variety of ways to implement prediction markets, including within a corporate enterprise or other private network, on the open Internet, on a service bureau basis (e.g., to a group of select users on the Internet), to a group of individuals, via distributed software (such as a spreadsheet program or a financial management tool), or otherwise. Several such ways of making prediction services available will be discussed by this disclosure, along with a variety of mechanisms for implementing different options. For example, in a corporate setting, it is possible to have an enterprise directory (e.g., a LDAP directory) provide information on employee status, job title, and so forth, to provide a repository for user data (as well as implied security clearance)—in such an environment, a third party consultant, for example, can host the software on a "service bureau" basis, designing prediction markets to suit the needs of the customer (the corporate client) and to interact with employees or contractors of the corporation (at home, work or otherwise) for purposes of collecting information used for making predictions. Other mechanisms might make sense when dealing with a private group of diverse individuals not having a common corporate affiliation, e.g., it might be desired to a public key infrastructure ("PKI") protocol to provide security and gate user access for such an environment. In yet another setting, it might be desired to have everything reside in one private network (e.g., a corporate network). Various types of design considerations will be discussed below, together with possible network architectures and software design considerations.

With an overview of one embodiment thus presented, instantiation of a prediction market and a related system will now be discussed in greater detail.

FIG. 1 generally indicates a prediction market system 101, seen as including a relational database 103, an administrator tool 111 and a processing interface 113.

The relational database 103 generally includes a number of individual databases, including a number of fields or cells 105 that are related together by mathematical or other processing dependencies. The cells that define these dependencies can be based on a spreadsheet tool, for example, Microsoft's "Excel" or "Access" programs, or more complex products such as those available from Oracle or other providers. Generally speaking, these tools will be used to create a first database that will serve as a log of user predictions ("bet log") and a second database that will cache a cumulative probability distribution for each event being modeled, each cumulative probability distribution mathematically compiled from related user predictions. In one particular implementation described below, the bet log is indexed by time stamp and represents all wagers entered for a particular database, even for events that have already transpired (i.e., where the outcome is already passed); the individual predictions may also be indexed by user. Indexing wagers in these ways permits easy periodic calculation of (a) a new probability model for any specific event (i.e., by simply polling the bet log to retrieve all prior wagers for the common event or "location"), and (b) a per-user history, which can be used to analyze user activity and determine which users tend to be more accurate than others. [The cumulative probability distribution for each event being modeled is stored as a "location" (i.e., in a record or field) in the second database.] A number of other individual spreadsheets or databases may also be created as part of the relational database, including a user profile database 107 (i.e., with each record providing information for a use), a security or group permissions database 109 (and delegations for adding new users, generally indicated by phantom lines in FIG. 1) and potentially other databases. In one embodiment, each location can be structured merely as a cache for mathematical calculations based on aggregated user predictions; for example, if each location is used to store a Normal distribution, then each cache can be indexed to a location "code" and formatted to include a weight, a mean (representing the mean of all user predictions), and a sigma-based value. Caching values in this manner permits what is effectively advance creation of a ready display of accumulated probability distributions without the need to recompute a probability model of an event each time someone with appropriate permissions wishes to view the probability model for event outcome.

The administrator tool 111 represents a set of utilities that can be used to setup a prediction market, grant permissions to others, change market parameters, and exercise general operating system administrator control over the entire database, related files and associated software. Generally speaking, an administrator will use these tools to (a) initially define the prediction market relational database, (b) establish mathematical and other relationships between specific fields of the various databases, and (c) establish permissions for wagering (prediction), viewing, reporting, printing and other functions. As part of the initial definition, the administrator may seed each prediction market so as to establish a baseline for an initial bet. For example, it was mentioned earlier that one embodiment of this disclosure converts user inputs to Normal distributions and then aggregates multiple Normal distributions to form a cumulative probability distribution (used to provide a "crowd-based" prediction for the event). In such an embodiment, the administrator might prior to the first wager provide an initial Normal distribution and weight the distribution to provide elasticity to support the first wager that will be received—if for example the prediction market is used to forecast "this quarter's profits", the administrator might set an initial weight of $5000 (representing $5000 in initial bets), an initial mean of $10M, and a standard deviation of $3M. The administrator should typically have an understanding of the value of a typical wager (e.g., $500 in play credits) and a somewhat accurate baseline for expected profits (e.g., last year's actual profits) for the market to offer the correct elasticity given the number and nature of wagers that will be provided, expertise that will be gained with experience.

The processing interface 113 provides most of the operations that occur with respect to the database, and serves as a vehicle to call (a) a calculation engine 115, when it is necessary to aggregate new user inputs representing additional predictions (e.g., wagers) with previous forecasts, as well as to provide roll-up and roll-down functionality, (b) a prediction tool 117, which essentially is invoked to permit a user to place a wager on any particular event, as permitted by the system design (the prediction tool is one type of widget functionality), and (c) a viewing and reporting tool 119, which renders meaningful charts and displays as desired for system design, and permits printing of some, all or none of the charts, again, as consonant with system design. Each location and/or user-selected-function in the prediction market can be designed with a different level of permissions. That is to say, security or group queries may be associated with data (e.g., does a user have permission to access a specific "location?") or around requested functions (e.g., "does this user have permission to invoke a specific function?"). When a user request to access, print or view a specific field or to invoke a specific function is presented, the user's account (or PKI certificate, or other security field) is checked to ascertain whether the requesting user presents proper group membership; once any group affiliation is known, the permissions database 109 can be checked to determine privileges and capabilities of the group. Notably, "security" and "group" "permissions" are interchangeably used herein simply refer to providing variable capabilities based on a set of criteria, and need not be based on administrator-specified limitations. For example, group membership may be inferred from social groups, meta data inferred from each user as appropriate, or potentially from other factors. In addition, "security" and "permissions" as used herein are not limited to restrictions in terms of a user's access or functionality and, for example, may encompass inclusive rather than exclusive capabilities (e.g., a prediction market system may suggest a predetermined set of widgets for a user based on express or inferred data, while providing the user a mechanism to also select other functions). As indicated by two phantom-line boxes 121 and 123, the calculation engine may be driven by (a) mathematical relationships associated with specific events (i.e., providing a tie between events and specific locations), and roll-up and roll-down subroutines may be called if prediction market design calls for these functions. Policies may also be employed, as indicated by box 125, to control access to viewing, printing, reporting and other functions.

Finally, as noted by graphics 127 and 129, the interface typically will reside on a machine such as a server, with the calculation engine, prediction tool, and viewing and reporting tool being driven by software, that is, by instructions stored on machine-readable storage media. As used herein, machine-readable storage media 129 can be any physical storage element used to provide information to computers, including random access memory ("RAM"), cache memory, hard disk, floppy disk, DVD, CDROM, or other format, whether physically attached to a computer, or remotely accessible by a computer (e.g., over the Internet). The machine can be any type of computer; to provide three non-limiting examples, it can be a standard personal computer (workstation or laptop), a machine within an enterprise (e.g., a server within the internal networks of a large corporation) or a machine on the Internet, such as a machine that provides hosting capabilities, shared with other business concerns or otherwise.

II. THE USE OF MULTI-DIMENSIONAL PREDICTION MARKETS; COLLECTION OF DATA

Figure 2A:
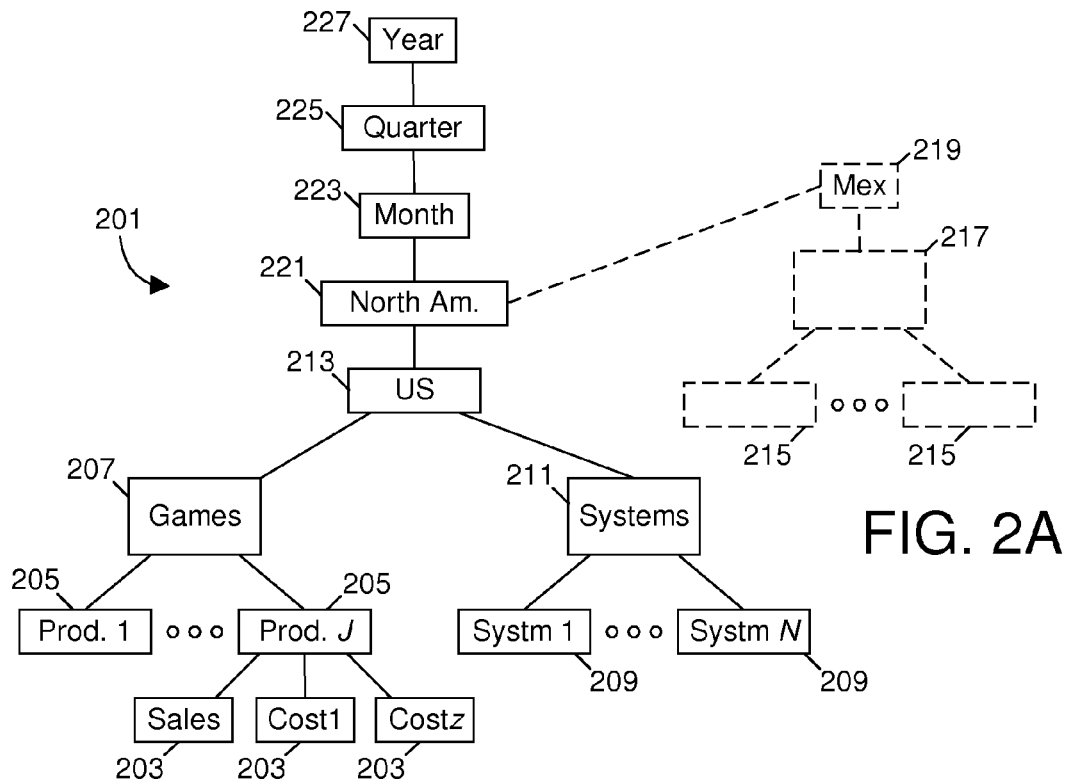
FIG. 2A is a diagram used to explain hierarchy in a multi-dimensional prediction market in the context of corporate financial forecasting. In particular, a prediction market hierarchy 201 is seen to include multiple types of products ("games" and "systems") which themselves can each consist of multiple different products within these types (as represented by numerals 205, 207, 209 and 211, respectively).
Figure 2B:
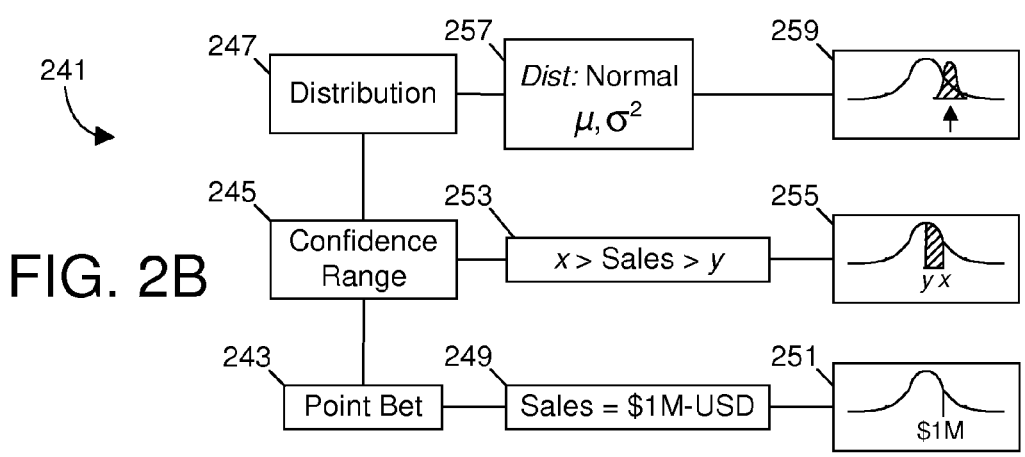
FIG. 2B provides a diagram that illustrates several ways in which a prediction market software can collect data with more robust expressions of possible outcome and associated confidence levels. In particular, the object of any particular "wager" on an outcome can be expressed as a point bet (e.g., "I bet team X will win the Stanley Cup"), or a confidence range (e.g., "I bet the total points for the NCAA mens' basketball tournament final game will be between 150 and 162"), or a distribution (e.g., "I believe the correct distribution for total points of the NCAA mens' bastketball tournament final game will be a Normal distribution having a mean of 157 and a standard deviation of 4"). These different types of expressions are represented by numerals 243, 245 and 247 in FIG. 2B; as indicated by corresponding graphics boxes 251, 255 and 259, a meaningful display may be provided to the user seeking to place a wager that shows exactly how a proposed wager might overlap with the "aggregate prediction" of other users (i.e., to show how the proposed wager compares to "crowd wisdom" and to provide associated odds or pricing that can be employed by the user to assess what the user stands to gain by winning the bet).
Figure 2C:
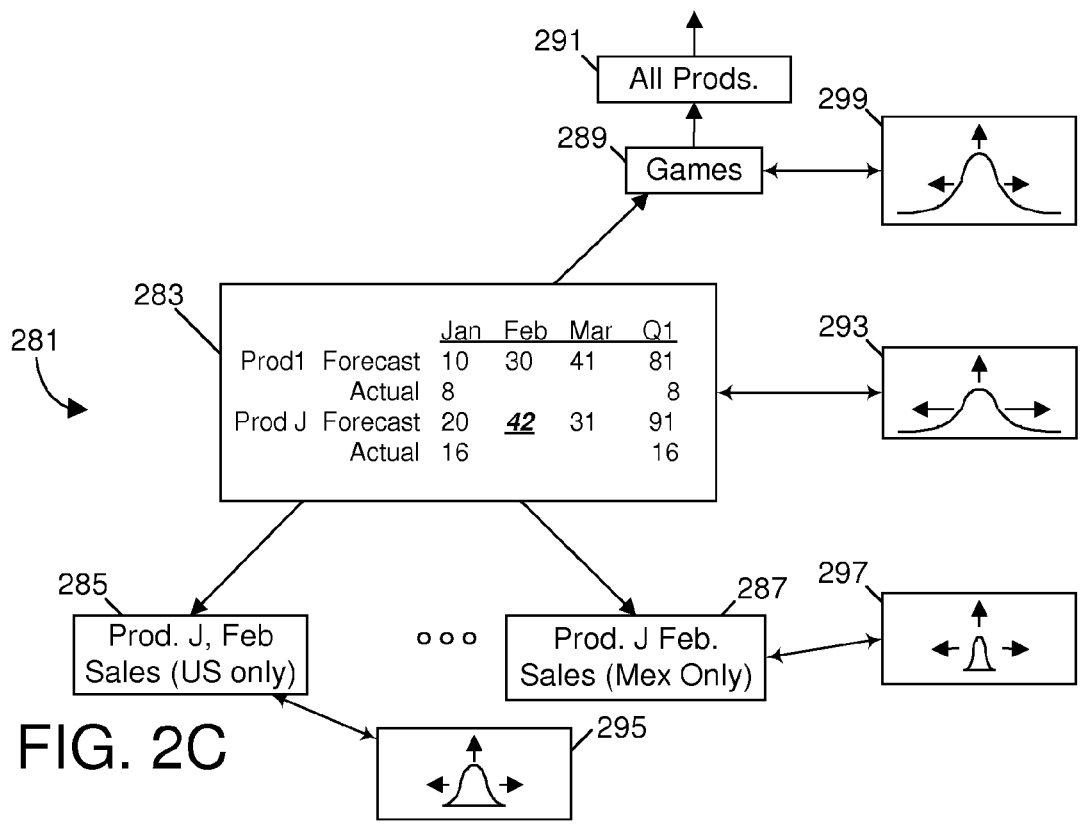
FIG. 2C provides a diagram used to introduce prediction aggregation in a multi-dimensional prediction market, generally represented by numeral 281; in particular, it should be assumed that a user wishes to place a wager that will potentially adjust a probability distribution for the market as indicated by graphic 293 (or alternatively, that an administrator or manager wishes to constrain or alter a field of possible outcomes). In this case, box 283 presents a multi-dimensional prediction market representing past (January) and future (February, March) sales of hypothetical products 1 and J. The market to be adjusted is the forecast for product J in month February (as represented by an italic, underlined figure "42"). This prediction is effectively cascaded to a geography dimension (represented as plural boxes or "events," including forecast sales for just the US and for just Mexico, as indicate by boxes 285 and 287) as well as to higher order, related markets (e.g., forecasts for "all products", as indicated by box 291) using "roll-up" and "roll-down" functionality described below.

FIGS. 2A-2C illustrate a number of examples pertinent to prediction market construction. In the examples that follow, it should be assumed that it is desired to keep track of events and employ user wagers to obtain crowd-based forecasts. The way that probability distributions are constructed using the teachings provided in this disclosure, meaningful information is solicited regarding the user's prediction, so as to construct one or more probability distributions will be used to model the occurrence of future events based on crowd belief. That is to say, assessments of individual users will be collected in a meaningful, robust manner, and aggregated using statistical methods to aggregate a crowd-based model.

FIG. 2A illustrates a hierarchy 201 of a hypothetical prediction market that will be used to build probability models for corporate financial forecasts. In particular, a first dimension of events, represented by boxes 203, represents milestones associated with a product (labeled "Product J" and identified by box 205 in FIG. 2A); as illustrated, events predicted by individual users may include time period "sales" for Product J and may be further based upon predictions of various contributing factors, such as the costs of different components of Product J. A fixed betting point (i.e., common betting point shared for all users) could be used to obtain a crowd-based prediction (e.g., "Will Product J's Sales For February be more than 20 units?"), but such a model typically gives poor information in terms of allowing users to express their own predictions—indeed, it may well be that most people believe Product J sales for February would be greater than "40 units," but this information would be difficult to capture using a predetermined, fixed betting point. In accordance with several embodiments presented by this disclosure, therefore, each user can define a personal forecast (e.g., a user-selected betting point, or a range based on a user-selected point), support that forecast with a weight (e.g., a wager), with the user's forecast being converted by the system into a probability distribution of a type that is common to the inputs of other users. In such a situation, it might make sense to permit a group of users most familiar with the particular product at issue (Product J) to make forecasts (e.g., employees of the division that makes the product), but nearly any scheme can be used depending on desired goals.

In connection with the example of FIG. 1A, it should be assumed that each user's input is converted into a Normal distribution, that is, one having a mean where deviation above and below the mean is equally likely. More complex distributions may also be used, but Normal distributions if appropriate to the event being modeled provide an advantage of relatively clean mathematical formulas, e.g., Normal distributions are symmetric. Thus, a plurality of wagers are collected for each game, each wager expressing an individual user's beliefs as to likely outcome and strength of conviction. These wagers in at least one embodiment are each converted to the common probability distribution type. A cumulative probability model is then constructed by aggregating together the forecasts of all participating users (e.g., for each game). Thus, the prediction market for FIG. 2A builds a Normal distribution expressing crowd wisdom as to likely game outcome for each event, e.g., predicted sales of each product for each month. These hypothetical events may be broken down or organized differently, for example, by month, quarter, region or otherwise. Each event may be something opened to wagering to a pool of users, in a manner described above, such that each user can express a forecast as to outcome, with user inputs weighted in a manner so as to express conviction of the user's forecast. As seen in FIG. 2A, the prediction market may be designed to as to permit users to make wagers for multiple products (e.g., any of Products 1-J), at multiple levels (e.g., sales of products versus bundled "systems," e.g., "Systems 1-N"), and may also be organized so that similar wagers can be made by country and region—these various features are represented by boxes 205, 207, 209, 211, 213, 215, 217 and 219 in FIG. 2A (boxes 215, 217 and 219 are shown in phantom lines in FIG. 2A to illustrate that any dimension is optional, depending on prediction market design). As indicated, such events are modeled as cumulative probability distributions based on aggregated, weighted forecasts of multiple users and can be organized according to any desired scheme (e.g., by country, region, month, quarter, year, per boxes 221, 223, 225 and 227).

As indicated earlier, one implementation of the principles of this disclosure is as software hosted (e.g., over the Internet) and offered to clients on a "service bureau" basis. In this regard, a company may host software functionality to manage prediction markets for others, along the lines indicated by these examples. A company may also provide consulting services to aid clients in the design of automated prediction markets that will provide robust forecasting services designed to meet the client's needs.

FIG. 2B provides several examples of ways in which different forecasts may be expressed via user inputs in the various embodiments discussed in this disclosure, and it also provides examples of graphical, interactive displays that may be provided to enable users to make meaningful wagers that reflect their beliefs. Generally referenced by numeral 241, three different forecast models are represented. A first forecast model is a point bet, represented by box 243; as indicated earlier, a fixed model is difficult to use to generate probability distributions, because it is difficult to capture user beliefs away from the predefined point represented by the fixed point, or to understand elasticity of beliefs as information (or other events) change. However, by permitting a user to select the user's own betting point, far more robust data can be collected. A second forecast model (used in most of the specific examples represented below) is a confidence range, represented by box 245. Generally speaking, such a range will represent a user belief that event outcome will lie between two values (e.g., in some embodiments presented herein, the user can typically select each of a user-chosen high value and a user-chosen low value). For example, a user seeking to bet on a sporting event featuring Team 1 might predict that Team 1 will defeat Team 2 by 2-3 touchdowns or tries (or 7-14 points), for example. A range may also be represented as a Boolean function, e.g., a prediction that a team will not meet a spread of 10 points is equivalent to a range extending from plus ten points through negative numbers, i.e., a loss. Finally, a third forecast model is represented by a more complex distribution—a user can express a distribution (for example, a Normal distribution) in the form of a mean and sigma-based value (i.e., a distance from mean, variance, or other distance measure); taking the football or rugby examples just introduced, a user might wager that Team 1 will defeat Team 2 by an expected 10 points, but with a high measure of confidence that the final disparity in score will be 9-11 points, for example. Each of these forecasts are also represented by corresponding boxes 249, 253 and 257, which respectively provide examples of what a user input for each of a point bet, confidence range, or distribution, might look like.

The right-hand side of FIG. 2B also illustrates examples of corresponding graphical displays, 251, 255 and 259. One aspect of the present technology that provides for more robust user choice of forecast is an interactive, graphical display that provides the user with a charted probability distribution (cumulative to-date) overlaid by a user selected point, range, or other function. For example, for a graphical display 251 corresponding to a point bet, a probability distribution is presented to the user overlaid by an indication of where the user-selected point falls relative to the distribution (i.e., relative to the aggregated crowd forecast). As part of the display, the prediction tool described earlier in connection with FIG. 1 may provide expected return with pricing (odds) calculated relative to the probability distribution. That is to say, FIG. 2B indicates a price point of $1 M which is the user-selected bet point—the prediction tool prices this user-selection relative to the cumulative probability distribution such that, should the user change the user's proposed wager to a more mainstream forecast (e.g., consistent with the mean depicted in graphical display 251), the return is interactively changed to be less for a correct guess than if the user picked a point deemed relatively unlikely based on the cumulative distribution. Pricing a bet in this manner is relatively straightforward, i.e., there are straightforward, known mathematical formulas the permit computation of probability of a correct user prediction based upon the cumulative probability distribution, and return can simply be priced as the inverse of this probability, i.e., 1/p times the amount of the user's wager. To provide a second example, graphical display 265 shows a Normal distribution with a portion of the distribution curve shaded representing a range based on a user-selected high point x and a user-selected low point y. Here too, there exist straightforward formulas in statistics for computing the probability that the user is correct, i.e., the probability the user is correct is simply the ratio of the shaded area in graphical display 255 relative to the overall area under the distribution curve and, again, user payoff may be computed based on a straightforward pricing model (such as 1/p times the amount of the user's wager). The third graphical display 259 is seen to overlie two probability distributions, one representing the prediction market event in question, and one representing a user selected betting weight within their selected range. For example, applying the previous sports-based example once again, a user might wish to bet $500 that Team 1 will beat Team 2 by 10 points, but also wishes to hedge his or her bet to cover a broader range with less emphasis, e.g., the user may wish to be $250 that Team 1 will beat Team 2 by 9 or 11 points, and $100 that Team 1 will beat Team 2 by 8 or 12 points. Such a betting model may be effectuated by permitting the user to select a probability distribution and associated parameters (e.g., such as mean and a sigma-based value, in the case of a Normal distribution) and the return in this event is represented by a product-based mathematical formula. Again, while a Normal distribution is used in several embodiments below, nearly any type of distribution may be implemented using the teachings provided by this disclosure.

FIG. 2C provides an example of the effects of market roll-up and roll-down on a prediction market. In particular, FIG. 2C provides a hierarchy 281 consisting of a hypothetical product sales spreadsheet 283, a separate dimension consisting of a country breakdown (represented by boxes 285 and 287, for hypothetical sales in the US and Mexico), and two further dimensions consisting of "All Games" 289 and "All Products" 291. The product sales spreadsheet itself contains a number of entries, seen to include forecasts for Product 1 and Product J, broken down into three months (January, February and March) and a cumulative total for the quarter. [In this example, of course, it should be assumed that Product 1 and Product J are games, and that it is desired to permit any one of a group of individuals to selectively "bet" on (and provide forecasts for) any of the numbers represented for the spreadsheet 283, for the months of February, March, or for the quarterly result—the month of January has already passed, as January shows a forecasted mean of "10" next to an event outcome of "8"]. Notably, in some implementations, it may be desired to prevent users from betting on values where the event in question has already materialized. In connection with FIG. 2C, a user may wish to bet on a February sales total for "Product J" (based on the cumulative probability distribution for this month to-date). The user triggers this functionality by "clicking" on the displayed probability distribution mean (i.e., on the number "42" depicted in spreadsheet 283) which in turn invokes a widget to provide interaction with the user. Many different types of functionality may be provided by the widget, including the ability to place a bet, managerial ability to skew aggregated probability distributions, ability to select other widgets or, conceivably, other functions. For example, if the user desires to place a bet, the widget may permit a user to select a betting option and then may invoke a calculation engine to potentially change the existing probability distribution for the event being bet on. If the widget is invoked by a manager in possession of new information (e.g., the manager wishes to narrow the cumulative probability distribution because the manager believes the distribution is unreasonable, the widget may permit the manager to change the mean, or otherwise modify the cumulative probability distribution. Widget functionality associated with specific views, reporting options, search options and other features may also be provided.

As any particular event is changed, any change is "pushed upward" (or "rolled-up") as represented by a directional arrows linking the spreadsheet 283 with the dimension "All Games" and "All Products," and also "pushed downward" (or "rolled-down") as represented by directional arrows connecting the spreadsheet 283 and country breakdown dimensions 285 and 287. In the case of FIG. 2C, it should be assumed for this hypothetical that roll-up involves the conversion to a common probability distribution model (e.g., Normal distributions) and then recalculating a new forecast at each level in succession. For example, if the February forecast for "Product J" is revised upward, the quarterly distribution based on that forecast is also recalculated, using the forecast for March and the actual data for January; the forecasts for "All Games" and "All Products" are then recalculated, using the new (revised) mean and sigma-based value obtained after incorporating the new user input. Roll-down can be effected in a number of ways, but preferably is implemented in a manner that spreads changes in a fair manner across contributing markets, with similar distributions of change in sigma-based value also pushed to the sigma-based values of contributing markets, all calculated in a manner so as to prevent arbitrage. For example, each contributing market (e.g., projected sales for Product J for February for each of the US and Mexico) will have an associated mean, sigma-based value, and weight (representing the bets to-date for the prediction market)—pushing changes downward may simply consist of spreading any change to each contributing market, with changes as to sigma-based value further scaled by the number of wagers to-date (i.e., weight) of each contributing market. These mathematical operations should be relatively straightforward to implement. Further, details regarding prediction market roll-up and roll-down will be further presented below.

The right-hand side of FIG. 2C also shows the effects of user change to the spreadsheet 283 via graphical depictions. In particular, a first graphical depiction 293 shows a Normal distribution with upward and sideways arrows, representing a user-change that increases the mean as well as the variance of the forecast for Product J. Rolled downward, the resultant change to US and Mexican markets (depictions 295 and 297, respectively) cascade to relatively smaller changes in distributions—spread across two markets, the amount of increase to each market may be more or less than the total increase for all countries. Rolled-upward (per graphical depiction 299), the change is watered down by virtue of aggregation with other, unchanged events, and the corresponding increase in mean and variance are smaller than for the middle depiction 293.

With examples of prediction market setup, data collection and roll-up and roll-down functions thus presented, the configuration of some exemplary software for performing the processes described above will now be introduced with additional detail.

III. DATABASE SETUP AND OPERATION

An administrator typically defines initial market conditions such that individual user predictions can be made for predetermined events. For example, if one desires to setup a prediction market around a particular event, the administrator typically defines an initial distribution for the particular event and associated widget functions, to provide something that users can view, to provide widget functionality to enter bets, and to also provide system elasticity. For some embodiments, it may be desired to permit users to make predictions only for certain fields or locations; for other embodiments, select users may be restricted in their view capabilities for aggregate (e.g., locations may be hidden from or visible to group members, with or without widget functionality, depending on group affiliation, including inferred information such as job function). Strictly speaking, administrator setup is not "required" for all implementations, e.g., there are embodiments where the setup may be commensurate with the first prediction from a user group and, generally speaking, setup processes may depend on desired database organization and application.

Figure 3:
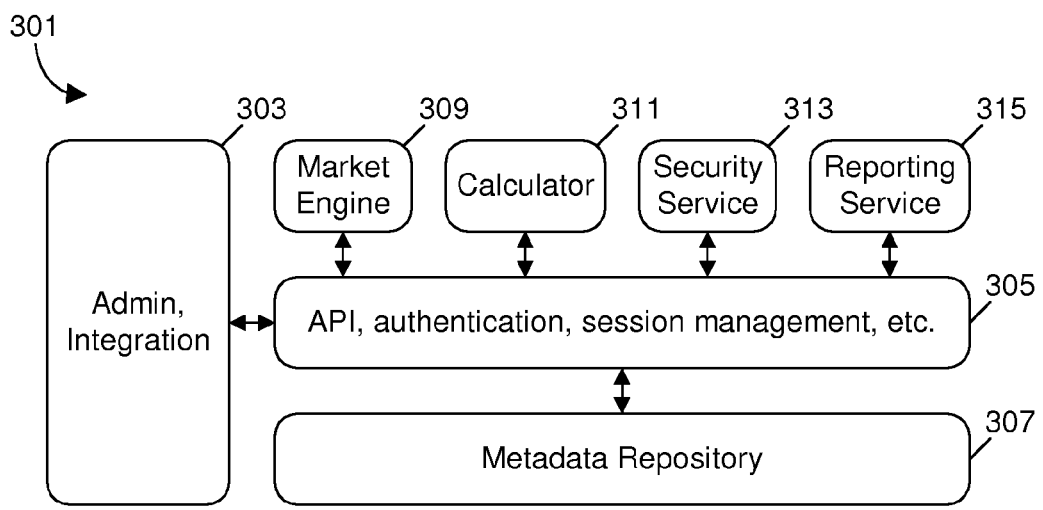
FIG. 3 is a diagram illustrating module configuration 301 of one implementation of the principles provided by this disclosure. As indicated by FIG. 3, a system implementing principles of this disclosure may be implemented as software running on one or more computer systems.

FIG. 3 illustrates module configuration 301 of one system implementation. In particular, FIG. 3 shows a number of blocks 303, 305, 307, 309, 311 and 315 where each block represents a different piece of software or a database component. As with other examples provided by this disclosure, the software components depicted in FIG. 3 should be assumed to be instructions stored on machine readable media, e.g., software, firmware, or other form of machine-executable code stored in one location or several diverse locations. Alternatively, the different pieces of software indicated by FIG. 3 can be combined into combination blocks (i.e., multi-functional modules), with the particular configuration dependent on application. FIG. 3 illustrates an example implementation as it might appear for a corporate enterprise.

A first block 303, labeled "Admin, Integration" represents a tool that can be used for initial database setup as well as a connection to external repositories containing descriptions of dimensions, hierarchies, data feeds, or other information. An administrator within an enterprise for example can be one sufficiently familiar with information technology to establish a database structure so as to, for example, store an initialized database in a fashion that may be retrieved and viewed by users of the database and to otherwise provide the links to pull in other information (e.g., from an LDAP directory). The first block 303 represents software that would be used by one for this purpose, with the software configured to be as simple as a spreadsheet program or to be more intricate, for example, software that presents an administrator with a series of questions and that builds a rudimentary spreadsheet, and viewing, reporting, printing and other functions, based on the administrator's responses.

A second block 305 is labeled "API, authentication, session management, etc." and represents software that manages the database after initialization, i.e., software used for rendering images of the database, as well as for widget functionality, including commands to open up a spreadsheet associated with a location, to print and to enter prediction/wager. As indicated earlier, one implementation of the system provides a spreadsheet view where a user may "click" on individual entries, to invoke a widget associated with the individual entry. The widget in turn invokes one or more functional commands associated with authenticating the particular user, determining group membership (and any associated permissions) and selectively allowing the particular user to enter a forecast or wager or print a newly displayed page. The second block 305 represents the software that performs this functionality, as well as subroutines for invoking others of the functions represented in FIG. 3.

A third block 307 is labeled "metadata repository" and represents a database of metadata used for searches associated with the database (and associated prediction market). This database may be customized depending on the particular application but, generally speaking, includes stored metadata types selected by the administrator to allow search engines to retrieve data associated with the prediction market or its various dimensions, e.g., product names, dates, specific results and so forth.

A top row of blocks 309, 311, 313 and 315 represents specific modules that may be called as needed for database operations. Block 309, also labeled "Market Engine," can be invoked to generate an interactive probability distribution and display to a user and to permit a user to price and place a wager using the interactive features. A calculator module (or calculation engine) 311 is invoked to update associated locations based on a newly placed wager (or other change associated with a dimension of the prediction market, including roll-up or roll-down functionality as introduced above). Block 313 represents security (e.g., group) operations, used for querying a database (e.g., LDAP, PKI certificate list, or other listing) to determine credentials status (including any revocations list analysis), and determining group membership. Finally, block 315 (labeled "Reporting Service") is invoked to generate predefined report formats and provide associated printing functionality.

FIG. 4 represents another possible layout 401, illustrating organization of a relational database, viewed from a systems perspective. In particular, the database includes (a) a group definitions database 403, (b) a bet log 405, (c) a locations database 407, a report templates database 409, (e) a database of user profiles 411, and (f) a client database 413. The group definitions database stores an indication of privileges by group, as well as a list of users associated with each group (group definition). The bet log 405 represents a time-based log of each wager that has been entered by any user for any location in the database, including for events that have since transpired (and for which betting have been subsequently closed). As each new wager is received from a user, it is entered into the log (e.g., as returned by one of the modules from FIG. 3), and the calculation engine functions to calculate a cumulative, revised probability distribution for the event in question and to perform roll-up and roll-down functions. Each revised distribution is stored in a corresponding "location" (e.g., record) in the location database 407; the location database is used in one embodiment simply as a "cache" for the cumulative distribution function for each event modeled by the prediction market, and is indexed by a number that also appears in the bet log for each associated wager (e.g., bet ID=#xxxx).

Notably, in one embodiment, prediction market roll-up or roll-down is facilitated by converting and storing each event (i.e., the probability function stored in each location) and each wager in the bet log into a common probability distribution type, e.g., a Normal distribution. Thus, the location database 407 is also labeled with values "w", "$\mu$" and "$\sigma^2$", respectively representing "weight," "mean" and "variance" (i.e., an example of a "sigma-based value"), representing that these values may be stored for each location (which therefore completely describes a Normal distribution function associated with aggregated user inputs for the particular event). In this context, nearly any "weight" measure may be chosen, but for many embodiments, the "weight" of associated user bets is used (e.g., amount wagered), to represent the strength of user conviction. For example, if users bet heavily for one event, but not for another, the weight measure is used to represent that relative preference. The mean represents the averaged midpoint for user predictions for an event, normalized by the weight (amount) of each user wager, and the sigma-based value represents divergence (e.g., standard deviation, variance, or another distance measure) of user predictions about the mean. The location database may be used to allow for a quick, relatively calculation-free display of forecasts for any particular event, or a set of events. In an alternative embodiment, instead of "freshly" computing a probability distribution from all related user predictions for an event from the bet log, the system may retrieve a specific location from the location database and directly combine a new user input (prediction) with the contents of the associated location. For example, if the user input is represented as a Normal distribution, with a mean, a sigma-based value and a weight, and the location is stored using the same variables, the two probability functions may be combined in a manner described below, with a modified cumulative distribution being computed and used to overwrite previous contents of the associated location (the new user input is also stored in the bet log as previously described). To enable this functionality, if the user input is expressed as a point bet or a range, these values are converted into a Normal distribution for purposes of the combination. For example, if a user enters a range, e.g., "1000-5000," and bets $100, the mean would be "3000," the weight could be chosen as $100 (or a value dependent on this amount) and the sigma-based value could be chosen as the standard deviation, variance or another spread-based value. The Normal distributions would then be combined by a mathematical operation that combines the means for the two distributions (adjusted for weight) and by a mathematical operations that convolves the sigma-based values, again adjusted for weight, to arrive at a modified sigma-based value. A new, cumulative weight would also be calculated, representing the combination. Other methods of combining inputs may also be used, but as alluded to above, several embodiments provided by this disclosure perform this combination efficiently by converting multiple inputs (e.g., information representing an existing distribution and a new user input) into a common probability distribution format (even if the new user input does not inherently match the common format).

The report templates database 411 defines a set of predetermined report formats, indexed by group membership (e.g., groups such as "author," "delegees of author," or a predetermined group), location and possibly other relational fields, depending on implementation.

For many implementations, the enterprise or organizer running the prediction market may wish to require user accounts, so as to permit only known individuals to make wagers. The use of a profile system also permits rewards to be given for correct predictions as well as penalties for incorrect predictions of events. For example, each user profile can store a running account balance, and be credited with the promised return for each correct wager, and debited as each wager is made; in this manner, the system may be configured to inhibit users with a poor track record from making new or large wagers, ensuring that users with demonstrated prediction abilities are emphasized in future forecasts.

Finally, the client database 413 can be any desired source of client information, for example, an authentications database used to enforce any restrictions as to viewing, printing or other functions, according to user. For example, as indicated by the text "LDAP/PKI" in FIG. 4, in one embodiment, the client database may include an enterprise directory used to restrict access based on enterprise network affiliations; in another embodiment, security may be enforced by possession of certain credentials (e.g., passwords, password generating tokens, possession of a specific type of digital credential such as a cryptographic certificate from a specific issuer), membership in an authentications list, or using other criteria. In at least one embodiment, a PKI infrastructure can be used to reliably authenticate users and/or encrypt transmissions. A PKI infrastructure affords an advantage in that it provides for security around a group of diverse users on the Internet who may have no inherent network or enterprise affiliation; for example, in an enterprise setting (e.g., where a prediction market is being driven within a large company), a PKI infra-structure may be used to extend permissions to third parties not having software or network security consistent with a particular enterprise.

FIG. 4 also helps illustrate the distributed nature of some relational database implementations of prediction markets discussed herein. For example, as represented by a first phantom (dashed) line 415, certain components of the relational database (e.g., components 403, 405, 407, 409 and 411) may be stored on one network or machine (represented by a first server graphic 417) while other components (e.g., component 413) may be stored on a distinct network or machine (such as represented by a second server graphic 419). To elaborate, in one embodiment, the first server graphic 417 may represent a website hosted by a company that provides prediction services to a remote enterprise client, while the second server graphic 419 may represent a site or system of the enterprise client, e.g., behind a distinct firewall. One embodiment provided by this disclosure is indeed a hosted "service bureau" prediction market service, with services being rendered to enterprise clients that designate their own employees or other individuals as the "users" who will enter wagers. As represented by a second phantom line 421 and a personal computer graphic 423, these users may be located in yet another location, for example, at a remote location with access provided via the world wide web (i.e., the Internet).

FIGS. 5-9 are used to provide additional detail associated with market setup and exemplary operation for a multi-dimensional (or "multi-tiered") prediction market. As mentioned earlier, by standardizing the data format of each "location" and, if desired, each wager, the present disclosure facilitates the solicitation of user-selected predictions and the aggregation of those predictions into a cumulative probability distribution, to develop a probability distribution based on the "wisdom" of a crowd. In one embodiment, each user input is collected as a range and a bet (e.g., weight), and converted to the common distribution format. In a second embodiment, an interactive, graphical display is presented to the user which permits the user to see the shape of the to-date cumulative distribution for the particular event, matched against a user-range selection that may be varied in a manner that immediately displays changes in expected return for different wagers (e.g., based upon the cumulative probability distribution to-date); that is to say, the interactive, graphical display facilitates a user's specification of one or more betting points (or a range of outcomes), because the user can weigh risk and outcome with strength of the user's beliefs. The presentation of data in this manner should further contribute toward automated collection and aggregation of meaningful data based upon this assessment.

FIG. 5 illustrates an optional method 501 for initializing a prediction market. As indicated, it generally is desired to form a cumulative probability distribution representing crowd forecasts, and for the method depicted in FIG. 5, it will be assumed that a computer systems administrator wishes to seed (initialize) a prediction market such that when a first user wager opportunity is presented, a probability function will already exist against which the user can weigh risk with expected return. Accordingly, FIG. 5 represents a method of initially seeding a prediction market for this function. In the example of FIG. 5, it should be assumed that a number of events are to be modeled (such as may be used for example in a multi-dimension prediction market). Numeral 503 therefore denotes that, if desired, multiple locations may be defined (e.g., as a database) with each location being associated with a respective event that is to be modeled. Each location is then initialized with seed data, as represented by block 505, and the administrator may then proceed to define groups and permissions if appropriate to the prediction market, as represented by function 507 in FIG. 5.

For each location, per block 505, the administrator can set an initial weight, mean and sigma-based value to describe a Normal distribution that will be used as a starting point for the prediction market. As indicated earlier, a Normal distribution need not be used for all embodiments, and the administrator may choose a different form of distribution, with the form of distribution and defining statistical parameters selected for ease of combination with other, like-probability-distribution forms. With the case of one embodiment discussed below, user inputs can be solicited as a range of data and associated wager amount (representing user conviction that the event, when it occurs, will transpire within the predicted range); to provide sufficient elasticity to initial user wagers, the administrator typically chooses the weight value to be large relative to anticipated user wagers, but not so large as to render the prediction market insensitive to anticipated user wagers. For example, if the anticipated pool of users is 50 individuals, and the anticipated average wager $100, the initial weight might be selected to be in the range of $500-$2000; were a first user prediction based on a wager of $100, this initial distribution would then be revised to incorporate the user provided range and reflect a new, combined weight (e.g., $600-2100). Similarly, the initial distribution parameters (mu and a sigma-based value for a Normal distribution) are selected to lie somewhat close to space represented by anticipated user wagers or event occurrence, to provide an appropriate amount of elasticity to the prediction market. These functions are represented in FIG. 5 by numeral 509. As mentioned earlier, nearly any spread measure may be used as a sigma-based value (e.g., for a Normal distribution), including a high/low extreme or other expression of distance from mean, although if desired, traditional variance and standard deviation (commonly designated in statistics as sigma-squared and sigma, respectively) may also be used—the term "sigma-based value" is not limited to the traditional measures.

FIG. 5 also shows a phantom line box 511, labeled "widgets," to denote that widget functionality may optionally be used in some implementations—a widget may be used for any location (and any displayed metric or event) where some functionality is to be invoked by "clicking" on the displayed metric or event. As one example, in a corporate forecasting environment or in a spreadsheet program, a widget may be associated with individual financial figures that appear on a spreadsheet and, when clicked, be used to invoke wager functionality. The user action (i.e., "clicking") may be used to invoke a dialog box that displays a graphic to the user and permits the user to interactively size up probability associated with any range selected by the user and anticipated return. That is to say, this embodiment provides a graphical display and using a computer cursor, permits a user to geographically select a particular part in the display, and invoke functionality dependent on the specific part of the display selected, as has been previously described. Widgets are not the only means of placing a wager, i.e., to provide a non-limiting example, individual numbers or events may be hyperlinked and used to direct a user to a web page used for placing a wager; other possibilities also exist. An example of placing a wager using a widget will be presented below, in connection with the discussion of FIG. 8.

For a multi-dimensional or multi-tiered prediction market (the terms multi-dimension and multi-tier are used interchangeably), the administrator may also link locations based upon associated mathematical or other processing dependencies, as indicated by reference numeral 513. For example, in a hypothetical corporate forecasting prediction market where it is desired to model "first quarter sales", a second "tier" of locations might be used to aggregate predictions for multiple "first tier" events together with any user wagers for an associated second tier location. It might be desired to permit users to make predictions on "sales for January," "sales for February," and "sales for March," and to define "first quarter sales" as a mathematical function for these month-based events. As each prediction is received, e.g., a wager on sales for March, it may be desired to "roll-up" a revised forecast for "March" such that it is also reflected in another tier (e.g., "first quarter sales"). If a new user input expresses a prediction of significant sales for March, the new user input is combined with existing user wagers (represented by a cumulative probability distribution for "March") to obtain a revised, cumulative probability distribution for March; because, however, this change in crowd prediction for March would also imply a change in crowd predictions for the first quarter sales, a cumulative probability distribution is also revised for "first quarter sales" to combine changes for March with the (unchanged) predictions for "January" and "February," as established through the mathematical dependencies selected by the administrator. Function box 513 refers to this linking between events, linking that can be performed using common spreadsheet or database functionality to define mathematical operations between locations. For example, a database record associated with the second tier (i.e., a location) may be defined as being equal to a simple sum of three other locations (that is, three first tier records, one for January, one for February and one for March using the example indicated above).

Prediction market roll-up is not the only type of multi-dimensional operation that may be performed, as it may be desired to roll-down predictions as well. For example, using the example just presented, if a user wager is to be made for "first quarter sales" and reflects significant sales relative to the existing distribution, it may be desired to adjust probability for lower tier events that contribute to the second tier event; increases in the distribution for "first quarter sales" may be spread across distributions for January, February and March, such that combinations of these distribution functions correspond to the revised probability distribution for "first quarter sales." While nearly any mechanism may be used to spread distribution changes to a lower tier, a systems designer may wish to choose the roll-down functions in a manner that does not create the opportunity for arbitrage. That is to say, it may be preferred to allocate changes from a higher tier market in a manner proportional to the contribution of each mean and sigma-based value of a contributing probability distribution; more detail on this methodology will be presented below in connection with the discussion of prediction market roll-up and roll-down. For the present, it should be understood that the administrator during prediction market setup may define any spreadsheet or relational database math (e.g., "w2c10=w1c24+w2c25+w2c26" where "w" represents worksheet or database designation, and "c" represents cell contents) to provide cross-dimension functionality.

Finally, as represented by function block 515, the administrator may then populate any higher or lower tiers as appropriate, including locations not associated with (i.e., not directly or indirectly linked with) other defined locations. Nearly any methodology may be used for this population, for example, roll-up and roll-down functionality may be used to permit the administrator to vary higher or lower tier initial distributions and cascade changes to other levels, and other software functionality may be used to alert the administrator as to any errors or locations which remain undefined.

The administrator may wish define groups and associated permissions for a prediction market (including ability to authorize group membership to others or ability to delegate certain permissions). For example, as generally indicated by numeral 601 in FIG. 6, an administrator may invoke this functionality using an administrator tool or module. An administrator first defines groups, general permission parameters and delegation capabilities, as indicated by function block 603. Then, the administrator may select any location as appropriate, per function block 605, and associate that location with one of the defined groups. For example, it may be desired to afford different individuals (1) different views, (2) different print capabilities, (3) authorization to enter wagers, (4) ability to modify an existing cumulative distribution, or (5) ability to run reports, all based on group membership. The setting of different functionality (e.g., print, view, widget or other functionality) and group membership requirements to obtain access to that functionality are respectively represented by numerals 607, 609 and 611 in FIG. 6.

Figures 7, 9, 10:
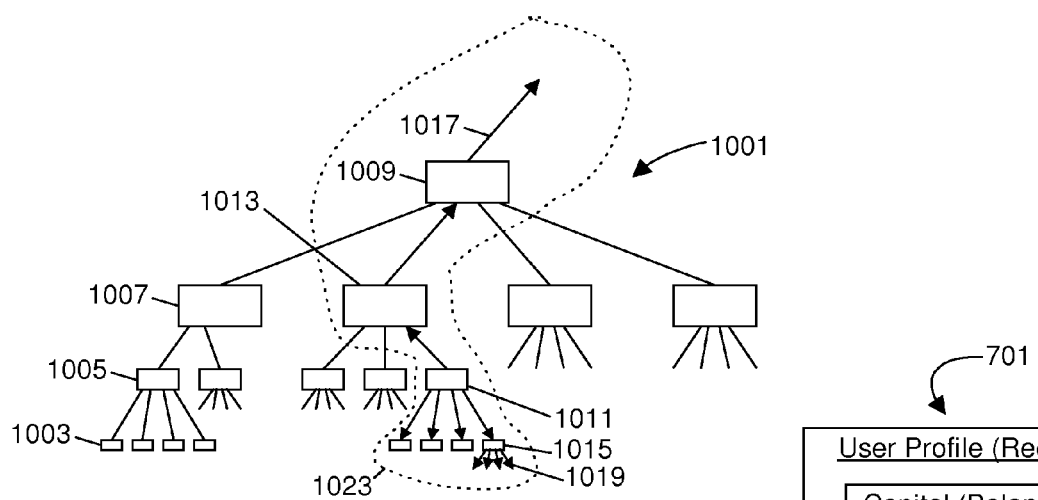
FIG. 7 is an illustrative diagram that shows possible fields for a user profile record 701. As indicated earlier with respect to FIGS. 1 and 4, one component of a relational database may be a user profile or account database, used to provide information about users, such as account information, account status, and potentially other options such as bet history.
FIG. 9 is an illustrative view of one implementation of a bet log 901. The bet log 901 represents one way of tracking wagers from all users and also for calculating views and aggregate predictions based on multiple wagers. In one embodiment, a prediction based on aggregation of wagers can be effectuated by weighting a newly-received wager with a weighted, previously computed aggregate forecast; in another embodiment, each wager associated with an event is indexed by "location" associated with the event and, with each new wager, every related wager is retrieved from the bet log and used to newly compute a probability distribution.
FIG. 10 illustrates hierarchy of a hypothetical multi-dimensional prediction market 1001, and is used to describe roll-up and roll-down. In particular, it should be assumed that either a new wager is to be made an intermediate location 1011 in the hierarchy, or that that a location is to be changed to reflect revised assumptions. [Nearly any type of change can present revised assumptions—for example, in a corporate forecast environment, a manager may decide that a particular forecast is too unrealistic and so may make changes to a probability distribution associated with that particular forecast.] This change is then rolled-up and rolled-down, as appropriate, to other locations that either depend upon the intermediate location, or that provides data or a prediction upon which the intermediate location depends.

One aspect of setup that deserves mention relates to the optional use of user profiles to regulate user wagers. While there are implementations that may be designed that do not provide rewards to users, or which do not require special permissions or security (e.g., group membership), in one embodiment, a user account or user profile system is used for (a) security, (b) record keeping, and (c) to provide rewards to users. FIG. 7 provides a block diagram 701 associated with the layout (e.g., fields) of one implementation of a user profile, i.e., it shows how a record for one user might be designed. As indicated earlier, a database of all user profiles might be kept as one component of a relational database system (see, e.g., numeral 411 of FIG. 4).

FIG. 7 illustrates structure of one hypothetical user profile 701, stored as a record of an account for a single user. As illustrated in FIG. 7, fields that may be included in such a record include capital balance, name, group association or associations, a link to an authentication source (e.g., a link to an LDAP entry, a PKI certificate, or some other source of authentication), an identification of number of trades made, winnings to-date, and a link to each location where a wager has been placed. Some of these fields are illustrated in FIG. 7 to have phantom (i.e., dashed) lines to indicate optional use, but in reality, each depicted field is optional and usage depends on specific implementation; conversely, nearly any other desired field (e.g., address, city, an ID number, title, corporate affiliation, and so forth, may also be included in a user profile. As with the other database initialization parameters mentioned above, an administrator typically initializes the database (e.g., defines a spreadsheet and associated fields) and uses script or other software functionality to permit new users to create an account and populate the associated fields.

One aspect of prediction markets alluded to above relates to the use of wagers to express user confidence around a prediction. To this effect, one embodiment of this disclosure calls for (a) specifically inviting users to participate in a string of prediction markets, (b) creating a user account and capital balance with a specific amount of "play money" with which to wager (these implementations may also be applied to Vegas-style gaming, if desired, i.e., wagers based on real money), (c) permitting users to selectively place wagers within the limits of their balance, and (d) rewarding users for correct wagers. Software managing the placement of wagers (e.g., the widget functionality mentioned above) may refuse to permit users to place wagers outside the bounds of the user's capital balance. By providing users with rewards and permitting users to "run out of cash," this particular implementation provides a system that rewards correct predictions and so funnels "strings" of prediction markets to a system where more successful users bet more heavily, i.e., (a) where cumulatively probability distributions are "more accurate" because they are weighted in dependence upon user wagers, and (b) where users with poor estimates are weeded from the system based on losses. Of course, in an enterprise setting, an administrator may choose to periodically provide threshold amounts of new capital to users who run out of cash. To this end, the "capital (balance)" field depicted in FIG. 7 typically represents a field not controllable by the user, other than indirectly, based on wagers made, won and lost.

An account-reward-based system is by no means required for every system, e.g., a prediction market could be designed to provide other forms of reward for correct predictions—for example, in a corporate forecast setting, each user could have a capital balance in which "1,000" points is placed every month, with a reimbursed dinner or other reward being provided to the user with the greatest return based on predictions. Nearly any type of reward may be used to provide a motivation for users to enter predictions, and in some implementations, it may not be necessary to provide a reward of any form.

As mentioned, each user account may also have entries for name, group, and an authentication mechanism (e.g., LDAP, PKI certificate, password, possession of a network account, and so forth), which helps fulfill an optional security purpose of a user account-based system. For example, it may be desired for some implementations to restrict wagers for certain locations to only "certain" users, for example, "managers." By including an authentication link as part of the registration information of each user, an administrator can anticipate prediction market designs where functionality (e.g., wager, print, view, report, modify, grant permissions to others) is restricted to individuals meeting a specific criteria (e.g., "managers," "employed by our company," "on our network," "having a PKI certificate issued by our private certificate authority," "on credentials list B," and so forth). Similarly, a name or similar field may be used if anonymity is not required, or if it is desired to run reports to assess demographics associated with participation, or with correct or incorrect wagers. Other fields, such as number of trades to-date (or within a specific time period), winnings to-date (or within a time period), avatar, nickname, email address, department, games participated in, and a listing of all wagers made may also be included; some or all of these entries may also be separated into a separate component of the relational database (e.g., all trades by user ID). Again, nearly any set of desired fields may be used if appropriate to the particular prediction market. Furthermore, if desired, user registration records and records of wagers made or widgets invoked may used for purposes of metadata collection (see numeral 305 from FIG. 3).

With general principles relating to prediction market setup and initialization described, additional detail will now be presented on prediction market operation including examples of one hypothetical prediction market, widget functionality, and processing used for prediction market "roll-up" and "roll-down."

IV. EXEMPLARY OPERATION

Figure 8:
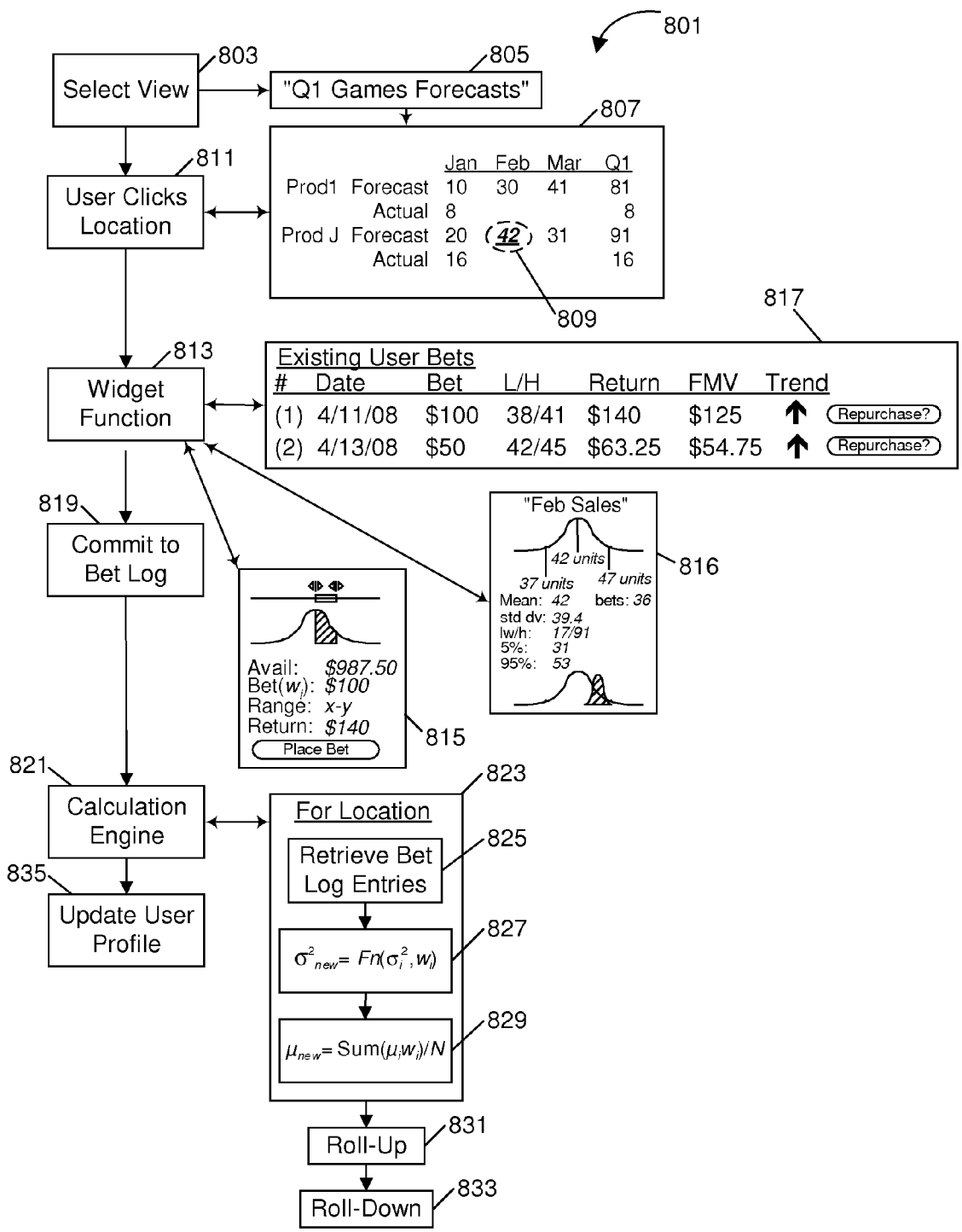
FIG. 8 is an illustrative view that shows interrelation between a method of placing a wager and associated interactive display capabilities provided by "widget" functionality, used in many of the embodiments discussed in this disclosure. Generally speaking, the left-hand side of FIG. 8 represents a method employed by a user to place a wager, while the right-hand side represents views that could be provided to a user and some host-level calculation functions used to integrate a wager into a prediction market that is the subject of the wager.

FIG. 8 presents a block diagram 801 of an example prediction market; in FIG. 8, various function blocks may be conceptually divided into a left-half, representing the functions associated with a user's placement of a wager, and a right-half, representing a number of database operations invoked by the user. In connection with the example provided by FIG. 8, it should be assumed that the user is participating in a prediction market run on behalf of a computer games vendor, and that the vendor is using the prediction market to obtain estimates of first quarter earnings (e.g. "Q1 games forecasts"). In this example, the company sells products "1" through "J", and the first quarter ("Q1") includes the calendar months of January, February and March.

A database may be designed such that a user enters this hypothetical prediction market by selecting a view, for example, by opening a web-page or a spreadsheet view associated with "Q1 games forecasts." For example, the user may select a view as represented by function block 803 by clicking a link to open up a database (reference numeral 805). A hypothetical web-page or spreadsheet view 807 is responsively displayed to the user, ideally as a graphical display that permits a user to view individual cells or images, themselves geographically separated within a display image. Numeral 809 and italics and underlining are used to designate one database entry for which it is desired to permit a user to wager, e.g., "Forecast for sales for 'Product J' for the month of February;" it should be noted that each product in this example (e.g., "Product J") includes a row for each of forecasts and events that are closed (i.e., where event outcome is already known). As mentioned, if desired, locations corresponding to events that have "closed" (e.g., occurred) may be inhibited from selection. In the case illustrated, numeral 809 identifies a number of "42" which represents the mean of the cumulative distribution (represented by user wagers to-date for the associated, or respective, event, i.e., a probability distribution for February sales for "Product J"). A user desiring additional detail on this estimate would place a cursor to overlie this particular cell (i.e., region or graphic within the display view 807) and invoke widget functionality by clicking (or taking a similar action) to prompt a specific function (e.g., placing a wager) or a choice among different widget functions (e.g., place wager, view crowd forecast, list wagers, and/or other functions). The invocation of widget functionality is represented by reference numeral 813, and three sample choices that may be offered are represented by graphics 815, 816, and 817, respectively. These graphics represent, respectively, an interactive display or display graphic that may be associated with placing a wager, viewing crowd forecast for the associated event, or viewing a listing of all wagers made the user has made in association with the particular event; as alluded, fewer functions or alternative functions may also be used.

Graphic 815 represents a display that may be used to enter a wager. The graphic in this example includes (in order from the top of the graphic to the bottom), (a) a set of two slider bars, used to adjust high and low values of a user-selected range, (b) a linear range indicator, which graphically superimposes a range represented by predictions to-date with a current user-range-selection, (c) a probability distribution display (e.g., a Normal distribution in this example), also superimposed with a user selection of range (shaded), for purposes of permitting the user to compare the user's selected range with the outcome probability based on other user's selection, (d) a listing of capital balance available for wagering (if user accounts are employed), (e) a current bet, (f) an alphanumeric indication of the user-selected-range (e.g., "x-y"), (f) an expected return based on the entered user wager, and (g) a pictograph, representing a an object that may be selected by the user to commit the user to the indicated bet. Two points should be mentioned in relation to the graphic 815. First, for a Normal distribution, the probability of the user correctly picking the outcome relative to the cumulative probability distribution is represented by the ratio of the user selected portion of the distribution (represented by the shaded area of the Normal distribution in graphic 815) to the total area (shaded and un-shaded) associated with the graphic; computation of probability is relatively straightforward using known mathematical formulas, and pricing of expected return may be made proportional to the inverse of this ratio, accounting for (if desired) mark-up or house-take, or the fact that outcome may lie outside of the range represented by all user predictions. Second, there exist a number of options for providing a graphical display to illustrate cumulative probability relative to current-user-wager, including options that price return (for a correct wager) (i) based only on the existing cumulative probability distribution, or (ii) based on a revised cumulative probability distribution that assumes the current-user-wager has already been made (even though not yet logged into the database). If the prediction market is to be designed to minimize arbitrage, it may be desired to employ the latter option.

Graphic 816 includes a simplified display of cumulative probability as stored in a "location" of the relational database. That is to say, with the processing functions described herein, a cumulative probability distribution may have already been formed based on crowd estimates and stored as a display image, by storing parameters necessary to produce a graphical display showing probability of expected outcomes; by accessing these parameters as a widget operand, software may display the cumulative probability distribution based on a small number of parameters, for example, a mean and sigma-based value in the case of a Normal cumulative distribution. Employed in corporate forecasting for example, graphic 816 may be used to visually a crowd-prediction, e.g., by observing aggregation of user forecasts, weighted by amount of each user's wager if desired, and a spread that displays the crowd's belief as to variance of event outcome. Specific metrics may also be presented, for example, as indicated, high and low values associated with the pool of predictions, 5% and 95% confidence intervals, standard deviation, and so forth. As indicated by a comparative display at the bottom of graphic 816, the probability distribution may be accompanied by specific numbers as well as comparisons with other data (e.g., last year's actual numbers, management forecast, forecast by a different pool of users, and so forth, collectively represented by the shaded curve).

Graphic 817 may be used to display a list of a user's wagers for a particular event. Importantly, in at least one embodiment, users are permitted to repurchase bets (e.g., based on changed circumstances or new information available to the user). It is believed that providing functionality to accomplish this end permits the incorporation of new information into the illustrated prediction markets, thereby providing for a more accurate crowd forecast. In connection with the illustrated graphic, a user may be presented with a listing (e.g., (1), (2), etc) of previous wagers and an ability to repurchase those wagers for profit or loss (occasioned for example due to wagers from other users). For example, if changed information implies that "February sales" will be far lower than anticipated, allowing users to repurchase earlier wagers provides an ability to incorporate such new information into the prediction market. As depicted in connection with graphic 817, each wager may be listed by date, bet committed by the user, high and low range, contracted return (if the earlier bet proves correct) fair market value of the identified bet (e.g., current value of the wager, or how much the user would credited through repurchase, less an optional repurchase penalty), current trend (i.e., recent changes in mean for the event), and a pictograph that allows a user to select repurchase based on fair market value. In many implementations, a software designer (or the administrator) may choose to log a repurchase as a negative contract that offsets the original wager, but with a new timestamp, so as to preserve records of betting traffic and times that may be correlated with external events, if desired. Also, it should be noted that whether or not characterized as a repurchase, the described functionality also permits a user (a) to make multiple wagers, and (b) to make negative wagers (e.g., that outcome will "not" be within a selected range); the latter may also be represented in a bet log as a negative wager for a user-selected range.

For each placed bet or wager, for example, entered as a new wager or repurchased wager via graphics 815 or 817, when the user selects a pictograph as represented by these graphics, the user wager (or negative wager used for repurchase) is committed to the bet log, as reflected by numeral 819. It will be recalled that in connection with an exemplary database design represented by FIG. 4, a bet log 405 may be used to store a pool of all user wagers for all events, ordered by time stamp or other identifier.

As each bet is committed (or alternatively, as each bet is priced, per the discussion above), a calculation engine function 821 is invoked in order to integrate the new user input into a cumulative probability distribution to-date for the associated event. That is to say, the calculation engine is invoked by software and, as discussed above, may (i) convert as appropriate the new user input and/or cumulative probability distribution to a common format (e.g., Normal distributions), (ii) combine the new user input with a cumulative probability distribution (e.g., by combining weighted means and weighted sigma-based values for each distribution), and (iii) overwrite a database record (e.g., a record associated with a specific tier or dimension of the prediction market) with a revised, cumulative probability distribution that reflects the combination. If the new user input is the first wager for an event, it may be directly stored as the initial cumulative probability distribution, or mixed with initialization values established by an administrator as discussed earlier.

Importantly, many of the embodiments discussed above have mentioned the use of a common probability distribution function, e.g., a Poisson, normal, or other standard type of distribution, and conversion of each user input to a common format. Several of the embodiments mentioned above use a Normal distribution as this format, principally because the Normal distribution represents a distribution with well-understood associated mathematics. The use of a Normal distribution and common conversion to this format may be preferred for some implementations to enable use of well-understood mathematics, but is not required to implement many of the teachings presented by this disclosure.

In a multi-dimensional prediction market per the examples presented above, in a situation where all user wagers are stored in a common "bet log," two methods may be used to combine the predicted outcome represented by the new user input with the cumulative distribution function for an associated event: (1) the cumulative distribution function may be retrieved with associated weights from a "location" (i.e., cell that stores cached cumulative distribution for display), and blended with the new user input; or (2) every other user wager to-date for the same event may be retrieved from the bet log and blended with the new input "en masse." FIG. 8 presents an example of the latter, i.e., as reflected by box 823, for each location affected by the new user input, the calculation engine (a) retrieves every bet log entry for the same event (e.g., a record of each wager in the bet log stores a location ID or, equivalently, some link to a common event), per numeral 825, (b) blends together individual sigma-based values (e.g., variance as indicated by numeral 827) to obtain a new sigma-based value as a function of individual sigma-based values for each associated user wager and associated weight, and (c) blends together individual means as a function of weights and means associated with each user input, as indicated by reference numeral 829. These new values (together with a new aggregate weight) are then stored in the specific cache "location" to replace prior contents, i.e., to thereby facilitate the display of a revised or updated cumulative probability distribution. As indicated by function blocks 831 and 833, after contents of a contents are updated (per box 823), roll-up and roll-down functions are performed (i.e., for a multi-dimensional prediction market).

Once the calculation engine has updated the location database (see block 407 from FIG. 4), software then updates the corresponding user profile, as referenced by numeral 835. For example, software may update a user profile record (exemplified in FIG. 7) and store the updated profile in a user profile database (see, e.g., numeral 411 of FIG. 4).

From a security standpoint, view, print, report and other widget or non-widget functionality may be tied to permissions as has been previously described; as a user selects a function (e.g., clicks a location), the widget or other software queries a database (see, e.g., client database 413 from FIG. 4) as to whether the user has adequate permissions to perform the requested function. In this regard, each "location" may return an indicator of each associated group in a group permissions database (see, e.g., numeral 403 from FIG. 4) in addition to cached display information for a cumulative probability distribution; the widget functionality may be designed so as to request a group permission level (e.g., whether the requested functionality is available to the group) and to query whether the particular user is part of the group. For example, in a PKI-based system, groups may simply be represented as an identification of a specific set of permissions and a list of names/certificates that belong to the group, with standard PKI protocols, e.g., revocations checking, being employed to authorize the specific user. In an LDAP or network based system, other factors may be used, such as the user's domain, server affiliation, pay grade, or other stored information. In some implementations, permissions may simply be inferred based on possession of a recognized, unrevoked credential, or network access. Access to specific views, specific "locations," reports or other functionality may be provided or denied in a conventional manner, e.g., by enabling or restricting access to specific worksheets, web pages, or in another conventional manner.

FIG. 9 presents an exemplary bet log 901. In particular, the bet log is seen to include a number of user wagers, each indexed by a wager number (e.g., "(1)-(i)") a timestamp, a user ID ("UID"), a location identifier (representing the specific event that was the subject of the user wager), a low range indication ("x"), a high range indication (y), a result for events that have occurred, the weight of the bet (e.g., wager amount), and a return (or the amount paid to the user). In this regard, each location (e.g., "123J7") identifies a specific event being bet upon by the user; in the example of FIG. 9, bets (1) and (3) relate to the same event ("123J7"), i.e., to the same location, so that in an embodiment that re-calculates cumulative probability distribution following each new wager directly from the bet log, software would poll the bet log to identify each wager for the same event (represented by the new user input), would retrieve each identified wager (e.g., events (1) and (3), associated with "location" "123J7"), and would use the calculation engine to compute a new cumulative probability distribution, revised to incorporate the forecasted outcome represented by the new user input. As mentioned earlier, some embodiments do not perform this process, e.g., they may ignore prior bet log entries and simply enter the new user input in the bet log and combine it with existing cache (i.e., "location") contents. FIG. 9 is also notable in that it shows a negative bet (i.e., wager no 4), used to "repurchase" or cancel a similar, earlier wager; as indicated above, this wager may be expressed as a negative bet. The illustrated bet log 901 may also be used to provide a record of all bets or wagers per user, i.e., by returning from the bet log all wagers corresponding to a specific user ID or set of user IDs.

V. CASCADING CHANGES TO RELATED MARKETS

As mentioned earlier, a problem can arise in multi-dimensional (multi-tiered) prediction markets where a crowd is called upon to forecast one event, and another event statistically is based on (or contributes to) the crowd forecast. This problem is illustrated with respect to FIG. 10, which graphically depicts a multi-tiered prediction market and associated database 1001; each location (or event) in this example is represented by a box, and every tier is formed by a group of boxes that are connected by dependency (i.e., by a line in FIG. 10) to a common box. For example, in FIG. 10, numerals 1003, 1005, 1007, 1009 and 1011 each represent plural adjacent boxes that connect to a common box—the several adjacent boxes identified by numeral 1003 all connect to box 1005, for example, and form a common tier. In this example, it should be assumed that a new user input is received for the right-hand-most box associated with numeral 1011, and that a revised, cumulative probability distribution is derived for this location and stored in an associated "location" in the relational database. This right-hand-most box, however, is seen to have dependencies that connect it with multiple levels above and below, as referenced by numerals 1013, 1009 and 1015, for example, and as represented by still higher and lower level dependencies indicated by arrows 1017 and 1019, respectively. An entire region affected by the revised, cumulative probability distribution is identified by a dotted-line perimeter 1023, representing all of the database records that may need updating in order to adequately cascade crowd-based predictions to other, related forecasts.

It is in this context that the function of roll-up may be applied within the affected region 1023 (i.e., to recompute probability distributions for locations 1013, 1009, and higher, per numeral 1017), and the function of roll-down may be applied within the affected perimeter 1023 (i.e., to recompute probability distributions for locations 1015 and lower, as represented by arrow 1019) in order to conform related forecasts to the changes. As mentioned above, changes at a specific tier (e.g., tier 1011) represented by a new user input (or administrator or manager modification forced modification of the crowd prediction) are presented at the affected tier by a wager entered into the bet log, and a revision of the cumulative probability distribution for the affected location. After this step is effectuated, software identifies each higher level tier location that references the "changed" location, and a subroutine invokes the calculation engine to determine a new probability distribution based upon both unaltered and changed probability distributions at the level below the identified higher level tier location. For example, if the right-hand-most box associated with numeral 1011 was modified to reflect a predicted outcome received as a new user input, software would compute a revised, cumulative distribution for the location identified by reference numeral 1013, based on the unaltered locations identified by numeral 1011 and the altered location represented by the right-hand-most box next to numeral 1011. On a nested basis, software would then identify that location 1013 was modified and that location 1009 referenced location 1013, so software would then calculate a revised, cumulative probability distribution for location 1009 based upon the locations referenced by numeral 1007 (unaltered distribution in this example) and 1013 (revised based on a lower-tier-record update), and so forth. The function of roll-down presents some additional challenges beyond roll-up, i.e., for roll-up, it is relatively straightforward to combine multiple lower-tier probability distributions to derive a revised prediction for a higher tier event; the dashed-line region above tier 1011 is seen in this example to encompass only one new location change at each higher level tier. By contrast, locations at tiers inferior to the right-hand-most location for tier 1011 are all affected by the change to that right-hand-most location; the dotted-line outline encompasses multiple locations at each inferior tier. To avoid arbitrage while maintaining consistency in forecasts, changes at a location associated with a higher-level tier are spread across all contributing locations in a fair manner. To effectuate "roll-down," the software for the changed location (e.g., right-hand-most location next to numeral 1011) from the computational formula for that location identifies each contributing location (represented by a simple sum for many prediction markets, e.g., "w2c10=w1c24+w2c25+w2c26" where "w" represents worksheet or database designation, and "c" represents cell contents). The calculation retrieves display image parameters for each of these locations (e.g., weight, mean, sigma-based value in the case where Normal distributions are used as a common format) and employs a mathematical function to spread change at a higher level across these lower-tier locations in a manner dependent upon weight and spread (e.g., sigma-based value), accounting for the relative weights at each level. In this regard, disproportionate wagers at one tier relative to another tier (assuming multi-dimensional wagers are permitted in the particular prediction market) should not result in excessive skew at the other tier and, accordingly, the spread function may be designed to have a blending function to account for spread between levels; the same applies for roll-up. The spread function (to distribute change across tiers) is preferably selected so as to avoid arbitrage by users participating in the prediction market. In addition, a systems designer may wish to establish a "lock" against accepting new wagers during roll-up and roll-down processes, to avoid the opportunity for arbitrage, and to ensure that new wagers receive up-to-date, accurate information about cumulative probability for a particular event.

FIG. 11 provides additional detail on a roll-up method, generally designated by numeral 1101. A calculation engine subroutine retrieves database parameters for a location that has had its contents changed; in the case of a Normal distribution, weight, mean and spread measure (sigma-based value) may be retrieved, per numeral 1103. The subroutine identifies a higher tier record (i.e., location) that is dependent upon the changed location, per numeral 1105, and it then retrieves similar database parameters for each location (change or unchanged) that contributes to the higher tier record, as indicated by function box 1107. Per numerals 1109 and 1111, the calculation engine then calculates a revised, cumulative probability distribution for the higher tier record such as by combining all sigma-based functions and means for the contributing lower tier records, factoring in weight. Also, as indicated by numeral 1113, the calculation engine updates weight (typically by simply adding the weight of the new user input, positive in the case of a new wager, and negative in the case of a repurchase or negative wager). With new parameters computed for the higher level record, the software then overwrites the higher tier record and marks it as a changed location, and then proceeds to yet higher levels until all higher levels have been processed.

Roll-down functionality is illustrated in FIG. 12, via block diagram 1201. In particular, for each changed location, the method begins by identifying whether there is any lower tier location upon which the change location depends. If there is, then the method 1201 is invoked as a subroutine and begins by retrieving cumulative probability distribution parameters for the affected location; as has been discussed above, in the case of a Normal distribution, weight, mean, sigma-based value and other parameters may be retrieved as appropriate, as indicated by numeral 1203. The software then processed down a level, per numeral 1205 and simultaneously retrieves each lower tier location upon which the changed record depends, as indicated by numeral 1207. As referenced by function blocks 1209, 1211 and 1213, each probability distribution for a lower tier location is then modified by spreading the "delta" for the immediately higher tier location change in proportion to existing values for particular lower tier location and the prior weight and mean and sigma-based value for the changed, higher tier location. Each lower-tier location is then updated, as indicated by numeral 1215. Importantly, for each lower tier location that is modified pursuant to this process, a "delta" is identified for it, and converted into a shadow trade (e.g., fictitious user trade) for the associated event, and placed in the bet log(as part of function 1217). That is to say, were a future user input to be received for a lower tier record, in order to preserve ability to recalculate a probability distribution directly from the bet log, the software may be designed to record changes (i.e., each delta) as though it were a user input, such that processing of the bet log to compute a new probability distribution will yield exactly the same result as obtained by prior roll-down from a higher tier record modification. With each lower-tier record affected by a higher tier trade affected in this manner, the software then marks the freshly modified lower tier records as changed, and proceeds for each modified lower tier location, looking for still lower levels that contribute to each modified lower tier location, and so forth, proceeding down each level as appropriate.

As mentioned above, a possibility can arise with roll-up and roll-down where cascaded changes need to be blended with user wagers affecting a higher or lower tier event. For example, if three first tier locations have hypothetical weights of 2000, 3000 and 1000, respectively, and a second tier location is based on a sum of the three first level locations, but has an existing user wager with a weight of "100," a new user input for the second tier location (e.g., a bet of $100) is received, the new wager should not result in vast roll-down change at the first tier locations. The calculation engine, and the roll-up and roll-down function in particular, therefore may be designed to have a blending function adapted to distribute change in proportion to the ratio of weights between levels, as alluded to above.

As can be seen from this description, the roll-up and roll-down methodologies may proceed through multiple tiers (e.g., three or more tiers, if featured by the associated prediction market and associated relational database), and the roll-down methodology can become significantly more time and computationally intensive than roll-up, depending upon design of the particular prediction market. The consistent use of a common distribution format (e.g., a Normal distribution) helps simplify the computational format associated with these functions.

By performing roll-up and roll-down in the manner indicated, changes in crowd forecasts may be cascaded to other related locations (e.g., other predictions or forecasts) using computer automation and standard software processing, to ensure that each related prediction is updated to correspond to changes in related markets. These methods and associated database principles therefore provide a forecasting tool that may employs crowd prediction to obtain relatively more accurate forecasts that respond readily to changes in assumptions (i.e., changes in information represented by user inputs).

VI. APPLICATIONS TO SERVICE BUREAU USAGE

The teachings presented above permit a number of business models, depending upon the desired goal. For example, as mentioned earlier, forecasting software using the processes and database structures described above may implement a prediction market to solicit crowd-based predictions for nearly any desired end. In connection with corporate forecasting, a business enterprise (e.g., a large company) may employ prediction markets within internal networks of the enterprise to obtain accurate forecasting from a wide range of individuals associated with various functions within the enterprise; these individuals preferably represent a diversity of function, so that user inputs are not correlated in a manner that reflects undesired bias. The teachings presented above may also be used to collect information about possible events, including political events or sporting events. For example, a sports information agency may use these teachings to predict the outcomes of sporting events, or sports seasons by collecting information in the form of user wagers from a blog base (whether weighted by bet amounts, provided with rewards or otherwise), to obtain probability distributions that reflect crowd wisdom. Still further, an entity may create software to perform these functions and sell that software to end users, such as a business enterprise or sports information agency referenced above.

A further business model based on these teachings employs a service bureau model to charge clients for crowd-based forecasting services. This service bureau model may feature a company that manages a database that implements a prediction market (e.g., part of a relational database such as presented above) or provides consulting for prediction market creation within an enterprise (such as by designing such a prediction market, or associated database). Such as service bureau business then generates forecasting results that may be provided to clients of the business, or for separate fee, to new clients as well. For example, a service bureau business may provide crowd-based forecasting services to a number of individual companies each for fee, and then may aggregate sanitized crowd forecasts (e.g., sales predictions for each of multiple companies) to provide sanitized or un-sanitized sector forecasts, for example to the individual companies themselves, or to others, such as industry analysts.

By facilitating the design prediction markets for others (e.g., enterprises or companies) to use based on the teachings presented above, or by provided crowd-based forecasts collected through the use of the processes and tools described above, the principles presented above provide for relatively accurate crowd-based models that respond quickly to new information and aggregate differing user predictions in a robust, meaningful manner that may be used to build probability distribution models based on crowd wisdom for an events.

VII. CONCLUSION

What has been described are methods, systems and structures for predicting events based on the views of individuals (i.e., based on a "crowd"). Using range data to build a probability distribution and grow the probability distribution based on new user inputs, these tools permit the collection of robust data from the individuals ("users") in a manner amenable to aggregation and the revision of cumulative probability distributions. Through the use of roll-up and roll-down functionality, negative wagers and other features presented above, linked prediction markets may be modified to always reflect changes in information in any of the related markets. While a number of the embodiments presented above relate to corporate forecasting, other embodiments are also possible.

For example, one implementation has been described above that collects a range of data from several users, and that maps overlap between these ranges to create a cumulative probability distribution. Another implementation has been described which uses user accounts, and provides rewards to users who have made correct forecasts. Other implementations are also possible, for example, including implementations that combine user-selected point bets with an initial range or initial probability distribution.

In addition, many of the embodiments presented above have relied upon a common probability distribution type to simplify aggregation of user predictions to combine probability distributions; it is also possible to combine diverse inputs including multiple forms of user inputs and multiple types of point bets, probability distributions or other data.

To provide yet another example, multi-tiered prediction markets were used in some of the discussion presented above, instantiated in a relational database, or based on collection of data by a remote host. Other forms are also possible, including collection of user data at a single location (e.g., a survey kiosk), use of single-dimensional prediction markets, and instantiation in forms other than a relational database. Notably, many of the examples presented above have also been discussed in the context of software, in a form sold to customers, implemented within an enterprise, or offered on a service bureau basis, but other implementations are also possible.

Other applications will readily occur to those having skill in the art in view of the teachings provided above, or in view of the invention defined by the claims set forth below. The foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

The invention claimed is:

1. A method of predicting an event, comprising:
   receiving in the form of digital data an initial probability distribution representing possible outcomes of an event;
   receiving an input from each of plural different users, also in the form of digital data, each input representing a predicted outcome for the event;
   aggregating the inputs with the initial probability distribution to create a cumulative probability distribution based on the inputs, where the aggregating includes using a computer to automatically convert the inputs to at least one second probability distribution, and using a computer to combine the initial probability distribution with the at least one second probability distribution to create the cumulative probability distribution; and
   creating a display image that includes the cumulative probability distribution for the event.

2. The method of claim 1, where:
   the method further comprises receiving at least some of the inputs at respective user computers, transmitting information representing the inputs from the respective user computers to a host computer system, and maintaining a record of each input; and
   each input represents a range of predicted outcomes for the event from the corresponding user, including at least a high value and a low value.

3. The method of claim 2, where converting includes computing a Normal distribution including at least a mean and a sigma-based value for each predicted outcome, using the corresponding high value and low value.

4. The method of claim 1, further comprising:
   upon occurrence of the event, identifying each input that correctly predicted outcome; and
   responsive to each correctly predicted outcome, performing at least one of (i) updating a corresponding user profile in response to the correct prediction, or (ii) transmitting an indication of the correct prediction to the corresponding user.

5. The method of claim 1, where:
   aggregating includes converting each predicted outcome to a Normal distribution including at least a mean; and
   aggregating includes computing an aggregate mean directly from the mean associated with each predicted outcome.

6. The method of claim 5, where:
   aggregating is performed by a host computer system by software resident on the host-computer system;
   aggregating includes converting the information for each input to a Normal distribution including at least a mean and a weight representing prediction confidence of an associated user; and
   aggregating includes computing an aggregate mean directly from the mean associated with the input from each of the plural different users, weighted by the associated weight representing prediction confidence.

7. The method of claim 1, where:
   aggregating includes converting information representing each input to a Normal distribution including at least a sigma-based value; and
   aggregating includes
   computing an aggregate sigma-based value directly from the sigma-based value associated with the input from each of the plural different users, and
   convolving the sigma-based values for the inputs to obtain the cumulative probability distribution.

8. The method of claim 1, where each input represents a range of predicted outcomes and a weight representing user confidence, and where transmitting includes transmitting for each input at least a high value and a low value between which the outcome is predicted, and the weight.

9. The method of claim 1, where the method further comprises storing the cumulative probability distribution in a specific record of a relational database.

10. The method of claim 9, where storing includes:
    when a new user input is received associated with the event, retrieving a mapping that identifies the specific record of the relational database; and
    storing at least a mean and a sigma-based value representing a revised, cumulative probability distribution, including a new predicted outcome associated with the new user input, in the specific record.

11. The method of claim 10, where the method further comprises:
    converting the information representing the new user input to at least a mean and sigma-based value;

retrieving the specific record to obtain at least a mean and sigma-based value associated with the cumulative probability distribution;

combining the Normal distributions associated with the new user input and the probability distribution, respectively, to obtain the revised, cumulative distribution; and overwriting the specific record to reflect the revised cumulative distribution.

12. The method of claim 1, where the method further comprises:

maintaining a record of each input, including maintaining a bet log collectively representing all of the inputs; and subsequent to the aggregating, receiving information representing a new user input representing a range of predicted outcomes and converting the information representing the new user input to a probability distribution, retrieving from the bet log each record representing a prediction for the same event as represented by the new input, to obtain a probability distribution associated with each such record, combining the probability distributions associated with the new user input and each such record, and overwriting the specific record to reflect the combining.

13. The method of claim 12, where each such record and the new input also each include information representing a weight, in the form of a wager, and where combining the probability distributions includes weighting each distribution in dependence upon the associated wager.

14. The method of claim 12, applied to a multi-dimensional event modeling system stored as a relational database, the relational database storing including at least two tiers of related outcomes, including a first tier having records that each represent a cumulative probability distribution for a respective event, each cumulative probability distribution based on aggregated user wagers, and a second tier having a record representing a second tier prediction dependent upon plural ones of the respective events, where the method further comprises:

retrieving plural first tier records to obtain associated cumulative probability distributions, each representing an aggregate of user predictions for outcome of the associated event;

combining the associated cumulative probability distributions to obtain a probability distribution representing the second tier prediction; and creating a display image based on the probability distribution representing the second tier prediction.

15. The method of claim 1, where:

the method further comprises, as each new input is received from a user, retrieving the cumulative probability distribution and pricing an expected return based upon a cumulative probability distribution; and creating the display includes displaying a distribution curve with a range of outcomes represented by the new input and associated probability extracted from the Normal distribution curve dynamically displayed to match user selection of range of outcomes.

16. The method of claim 1, further comprising:

the method further comprises, as each new input is received from a user, combining a range represented by the new input with at least one Normal distribution representing other inputs representing predictions-to-date for the event, and pricing an expected return based upon a cumulative Normal distribution representing the new input combined with predictions-to-date for the event; and creating a display includes displaying a Normal distribution curve with a range of outcomes represented by the new input and associated probability extracted from the Normal distribution curve dynamically displayed to match user selection of range of outcomes.

17. The method of claim 1, where each input includes a weight of user confidence in the form of a wager, and where performing includes providing a reward to each user that correctly predicted the outcome.

18. The method of claim 17, further comprising:

centrally-storing a user profile for each user, where providing a reward includes crediting a point balance for an associated user profile;

managing each user profile to debit the point balance for a lost wager; and inhibiting wagers by users for amounts above the point balance for the associated user.

19. The method of claim 1, applied to a relational database having plural records that each represent a cumulative probability distribution based on aggregated predictions for a respective event, the aggregated predictions for each event based upon a respective set of user inputs, each user input representing a predicted outcome for the respective event, where:

the method further comprises associating a new input with one of the sets, the new input representing a range of predicted outcomes for the one of the respective events, and maintaining a log representing user inputs for the respective sets on a collective basis, including the new input; and aggregating includes detecting the set associated with the new input, retrieving from the log information representing predicted outcomes for the set associated with the new input, combining the predicted outcomes for the set associated with the new input with the predicted outcomes represented by the new input, to obtain a revised, cumulative probability distribution associated with the one of the events, and overwriting a corresponding one of the plural records.

20. The method of claim 19, where retrieving includes for each user input retrieving at least an associated mean and an associated sigma-based value, and where combining includes calculating a cumulative mean and a cumulative sigma-based function directly from each mean and associated sigma-based function, respectively, obtained during retrieving from the log.

21. The method of claim 1, where receiving an input from each of plural different users is performed on at least one user computer system, and where the method further comprises transmitting the information over the internet to a host computer, the transmitting performed using HTTP.

22. The method of claim 1, applied to a relational database having at least two tiers, including a first tier represented by plural records, each record representing a cumulative probability distribution for a respective event, each cumulative probability distribution based on aggregated predictions obtained from user wagers, and a second tier with an event prediction dependent upon the plural events represented by the plural records, where the method further comprises:

receiving a new input represent a user prediction for a range of outcomes associated with a first tier record;

merging the new user input with one of the cumulative probability distributions, to obtain a revised, cumulative distribution; and responsively adjusting the event prediction of the second tier to obtain a revised cumulative distribution.

23. The method of claim 1, applied to a relational database having at least two tiers, including a first tier represented by plural first tier records, each first tier record representing a cumulative probability distribution for a respective event, each cumulative probability distribution based on aggregated predictions obtained from user wagers, and a second tier having a second tier record representing a second tier probability distribution dependent upon the first tier probability distributions represented by the plural records, where the method further comprises:
  receiving a new input represent a user prediction for a range of outcomes associated with the second tier record;
  responsively modifying the second tier probability distribution; and
  revising each of the cumulative probability distributions based on the modifying, to obtain a revised prediction for each one of the plural records, in a manner corresponding to modification of the second tier probability distribution, to thereby spread a change in the event prediction represented by the new input across each of the aggregated predictions; and
  storing each revised prediction in an associated one of the plural first tier records.

24. The method of claim 23, further comprising identifying a shadow trade for each respective event sufficient to adjust the associated cumulative probability distribution to correspond to the associated revised prediction, and storing the shadow trade as a user wager for the respective event.

25. The method of claim 1, further comprising:
  using a user account process to track predictions made by each user; and
  maintaining a database having predictions indexed by user.

26. An apparatus comprising instructions stored on non-transitory machine-readable media, the instructions when executed causing a machine to:
  receive an initial probability distribution representing possible outcomes of an event;
  an input from each of plural different users, each input representing a predicted outcome for the event;
  aggregate the inputs with the initial probability distribution to create a cumulative probability distribution based on the inputs, where the aggregating includes converting the inputs to at least one second probability distribution, and combining the initial probability distribution with the at least one second probability distribution to create the cumulative probability distribution; and
  create a display image that includes the cumulative probability distribution for the event.

27. The apparatus of claim 26, where the instructions when executed further cause the machine to:
  receive each input in the form of a range of predicted outcomes and a weight representing user confidence; and
  store a record of the input in the form of at least a high value and a low value between which the outcome is predicted, and the weight.

28. The apparatus of claim 27, where the instructions when executed further cause the machine to:
  subsequent to aggregating, receive information representing a new user input representing a range of predicted outcomes;
  convert the information representing the new user input to a third probability distribution;
  retrieve the cumulative probability distribution;
  combine the third probability distribution with the cumulative probability distribution to obtain a revised cumulative distribution; and
  overwrite a database record to reflect the revised cumulative distribution.

29. The apparatus of claim 26, where:
  the instructions when executed further cause the machine to manage a bet log that collectively includes a record of each of the inputs; and
  the apparatus further comprises instructions that when executed cause the machine to
    receive information representing a new user input representing a range of predicted outcomes,
    convert the information representing the new user input to a probability distribution,
    retrieve from the bet log each record representing a prediction for the same event as represented by the new input, to obtain a probability distribution associated with each such record,
    combine the probability distributions associated with the new user input and each such record, and
    revise the cumulative distribution to reflect the combining.

30. The apparatus of claim 26, where each input includes information representing a weight, in the form of a wager, and where the instructions when executed combine the inputs in a manner that weights each predicted outcome in dependence upon the associated wager to obtain the cumulative probability distribution.

31. The apparatus of claim 26, applied as a computer program to manage a multi-dimensional event modeling system stored as a relational database, the relational database storing including at least two tiers of related outcomes, including a first tier having first tier records that each represent a cumulative probability distribution for a respective event, each cumulative probability distribution based on aggregated user wagers, and a second tier having a second tier record representing a second tier prediction dependent upon the cumulative probability distributions for plural events, where the apparatus further comprises instructions to cause the machine to:
  retrieve plural first tier records to obtain associated cumulative probability distributions, each representing an aggregate of user predictions for the respective event;
  combine the associated cumulative probability distributions to obtain a probability distribution representing the second tier prediction; and
  store a probability distribution for the second tier prediction in the second tier record.

32. The apparatus of claim 26, further comprising instructions that cause a machine to, as each new input is received from a user, combine a range represented by the new input with a Normal distribution representing other inputs, representing predictions-to-date for the event, and price an expected return based upon a cumulative Normal distribution representing the new input and prior inputs representing predictions for the event.

33. The apparatus of claim 26, further comprising instructions that cause a machine to, as each new input is received from a user, retrieve the cumulative probability distribution for predictions-to-date for the event, and price an expected return to the user based upon a cumulative probability distribution.

34. The apparatus of claim 26, applied as a computer program that manages a relational database having plural records that each represent a cumulative probability distribution based on aggregated predictions for a respective event, the aggregated prediction for each of the plural records based upon a respective set of user inputs, where the apparatus further comprises instructions that when executed cause the machine to:

associate information provided by a new input with one of the respective sets, the new input representing a range of predicted outcomes for one of the events;

maintain a log representing user inputs for the respective sets on a collective basis, including the new input; and aggregate the information representing the inputs by detecting which of the plural records is associated with the new input, retrieving from the log the information representing each predicted outcome associated with the one of the events, combining each predicted outcome associated with the one of the events, including the predicted outcomes associated with the new user input, and revising the cumulative probability distribution to reflect the combining.

35. The apparatus of claim 26, applied as a computer program that manages a relational database having at least two tiers, including a first tier represented by plural first tier records, each record representing a cumulative probability distribution for a respective event, each cumulative probability distribution based on aggregated predictions obtained from user wagers, and a second tier that stores an event prediction dependent upon the plural events represented by the plural records, where the apparatus further comprises instructions that when executed cause the machine to:

receive a new input represent a user prediction for a range of outcomes associated with a first tier record;

merge the new user input with one of the cumulative probability distributions, to obtain a revised cumulative distribution; and adjust the event prediction of the second tier to obtain a second tier probability distribution.

36. The apparatus of claim 26, applied as a computer program that manages a relational database having at least two tiers, including a first tier represented by plural first tier records, each record representing a first tier probability distribution for a respective event, each first tier probability distribution based on aggregated predictions obtained from user wagers, and a second tier with a second tier probability distribution dependent upon the plural events represented by the plural records, where the apparatus further comprises instructions that when executed cause the machine to:

receive a new input represent a user prediction for a range of outcomes associated with the event prediction of the second tier;

modify the second tier probability distribution;

revise each of the first tier probability distributions based on the modifying, to obtain a revised prediction for each one of the plural records, to thereby spread a change in the event prediction represented by the new input across each of the aggregated predictions; and store each revised prediction in an associated one of the plural first tier records.

* * * * *